(12) United States Patent  
Zheng et al.

(10) Patent No.: US 11,796,696 B2  
(45) Date of Patent: Oct. 24, 2023

(54) SPATIALLY LOCATING A MICROSEISMIC EVENT UTILIZING AN ACOUSTIC SENSING CABLE

(71) Applicant: Halliburton Energy Services, Inc., Houston, TX (US)

(72) Inventors: Zhao Zheng, Cypress, TX (US); Henry Clifford Bland, Calgary (CA)

(73) Assignee: Halliburton Energy Services, Inc., Houston, TX (US)

( * ) Notice: Subject to any disclaimer, the term of this patent is extended or adjusted under 35 U.S.C. 154(b) by 342 days.

(21) Appl. No.: 17/271,850

(22) PCT Filed: Nov. 5, 2018

(86) PCT No.: PCT/US2018/059260  
§ 371 (c)(1),  
(2) Date: Feb. 26, 2021

(87) PCT Pub. No.: WO2020/096565  
PCT Pub. Date: May 14, 2020

(65) Prior Publication Data  
US 2021/0318457 A1    Oct. 14, 2021

(51) Int. Cl.  
*G01V 1/50* (2006.01)  
*G01V 1/22* (2006.01)

(52) U.S. Cl.  
CPC ............... *G01V 1/226* (2013.01); *G01V 1/50* (2013.01); *G01V 2210/1234* (2013.01);  
(Continued)

(58) Field of Classification Search  
CPC . G01V 1/226; G01V 1/50; G01V 1/42; G01V 1/228; G01V 2210/1234;  
(Continued)

(56) References Cited

U.S. PATENT DOCUMENTS

2007/0268781 A1    11/2007  Meunier et al.  
2012/0092960 A1     4/2012  Gaston et al.  
(Continued)

FOREIGN PATENT DOCUMENTS

CN       102435980 A     5/2012  
WO    2020096565 A1     5/2020

OTHER PUBLICATIONS

James et al., Fracture Detection and Imaging Through Relative Seismic Velocity Changes Using Distributed Acoustic Sensing and Ambient Seismic Noise, Dec. 2017, The Leading Edge, Special Section: Fiber-Optic Distributed Sensing, pp. 1009-1017 (Year: 2017).*

*Primary Examiner* — Toan M Le  
(74) *Attorney, Agent, or Firm* — Michael Jenney; Parker Justiss, P.C.

(57) ABSTRACT

The disclosure is directed to a method of utilizing an acoustic sensing cable, such as a fiber optic distributed acoustic sensing (DAS) cable, in a borehole to detect microseismic events and to generate three dimensional fracture plane parameters utilizing the detected events. Alternatively, the method can use various categorizations of microseismic data subsets to generate one or more potential fracture planes. Also disclosed is an apparatus utilizing a single acoustic sensing cable capable of detecting microseismic events and subsequently calculating fracture geometry parameters. Additionally disclosed is a system utilizing a processor to analyze collected microseismic data to generate one or more sets of fracture geometry parameters.

23 Claims, 22 Drawing Sheets

(52) U.S. Cl.
CPC .. *G01V 2210/1299* (2013.01); *G01V 2210/41* (2013.01); *G01V 2210/646* (2013.01); *G01V 2210/663* (2013.01)

(58) Field of Classification Search
CPC ....... G01V 2210/1299; G01V 2210/41; G01V 2210/646; G01V 2210/663; G01V 2210/123
See application file for complete search history.

(56) References Cited

U.S. PATENT DOCUMENTS

2014/0022530 A1    1/2014   Farhadiroushan et al.
2014/0064028 A1    3/2014   Coats et al.

\* cited by examiner

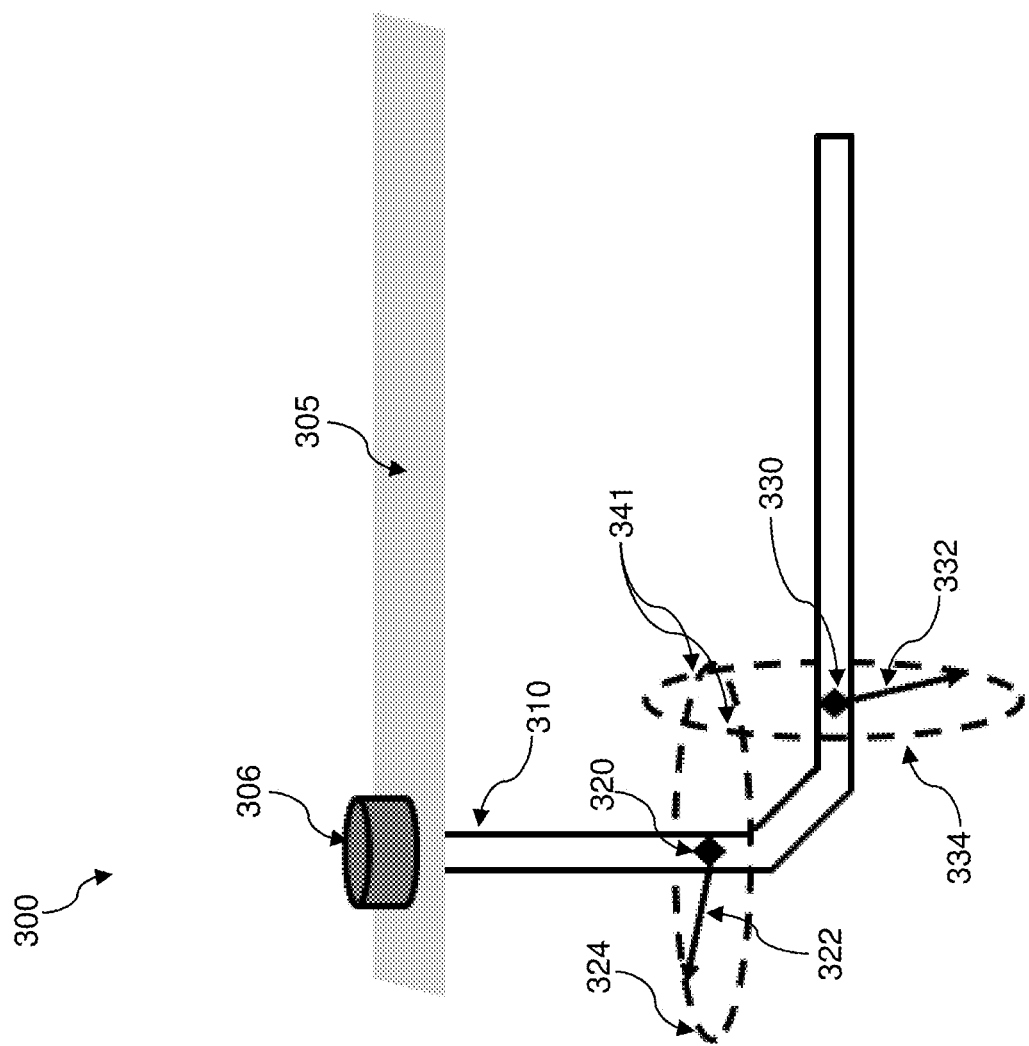

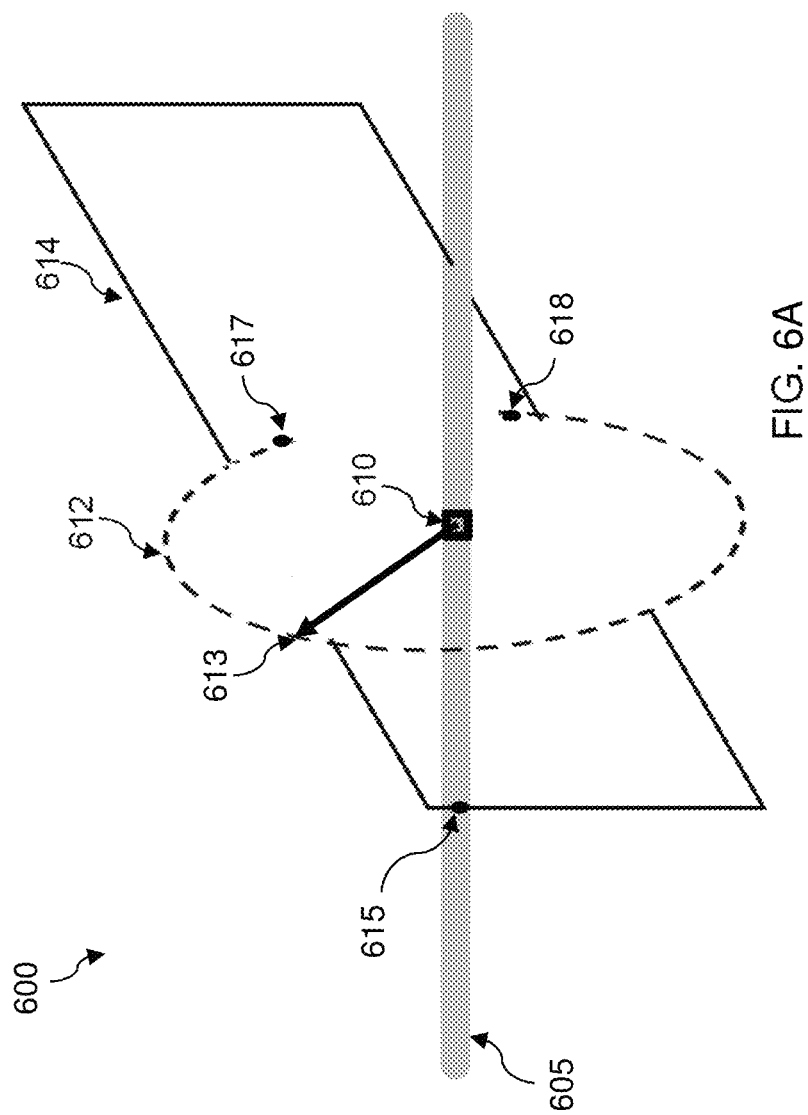

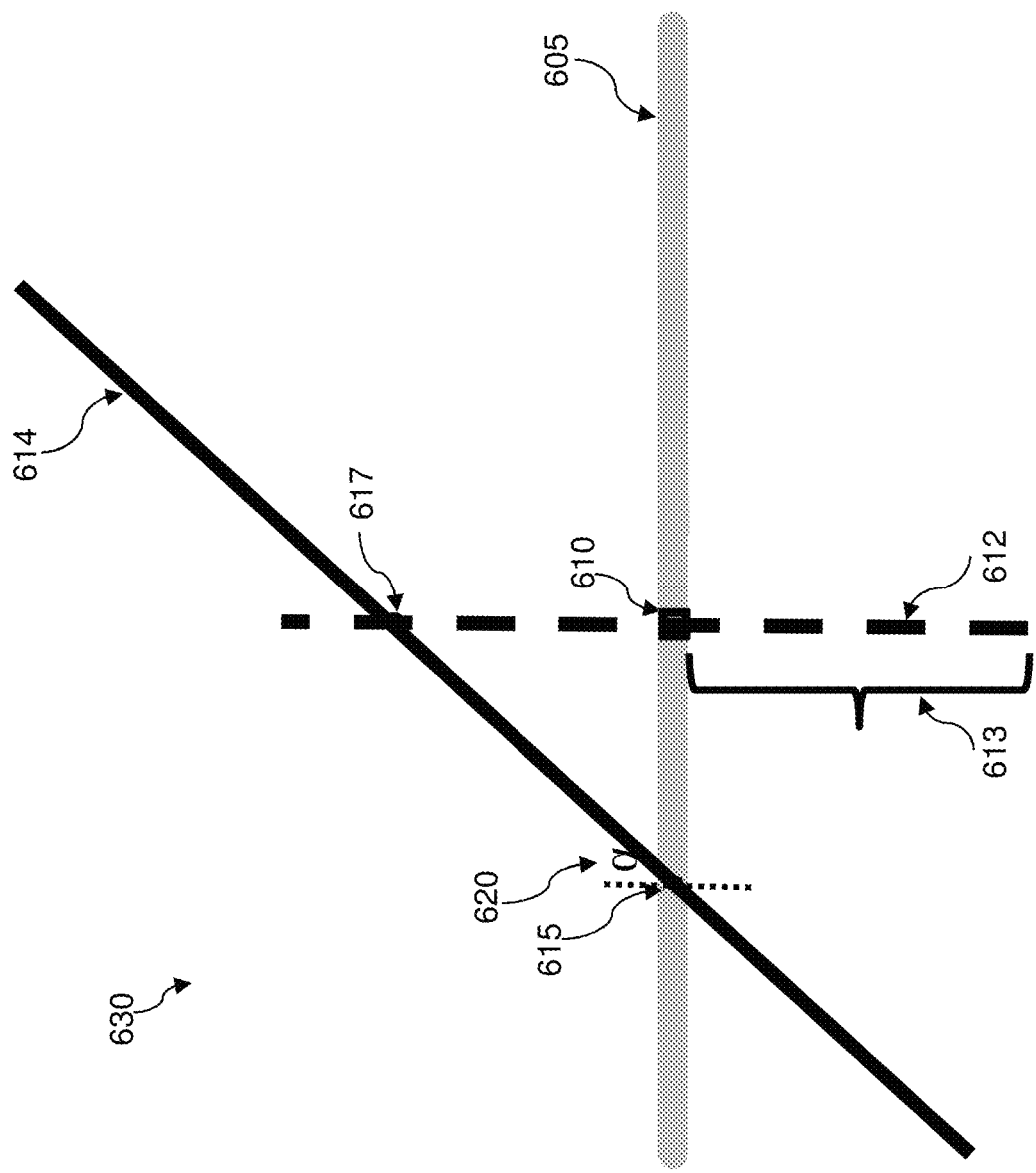

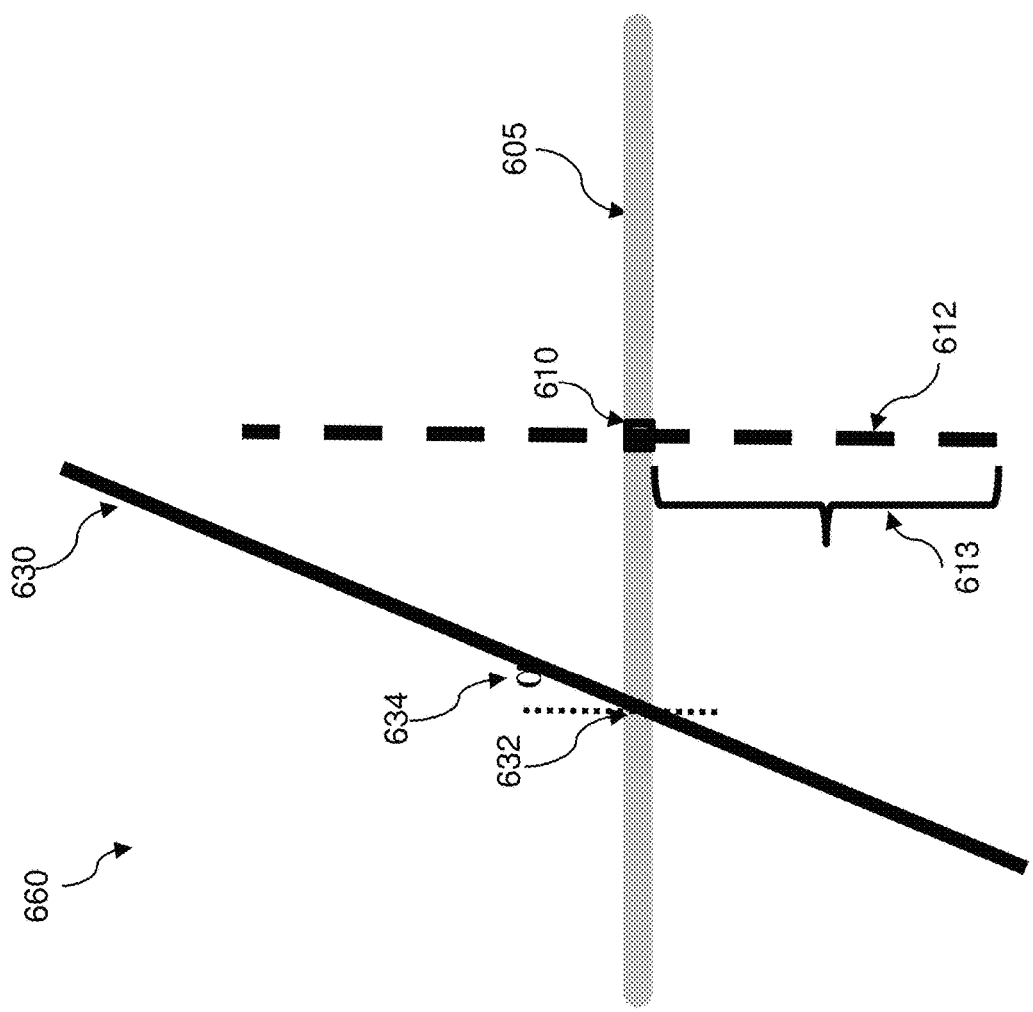

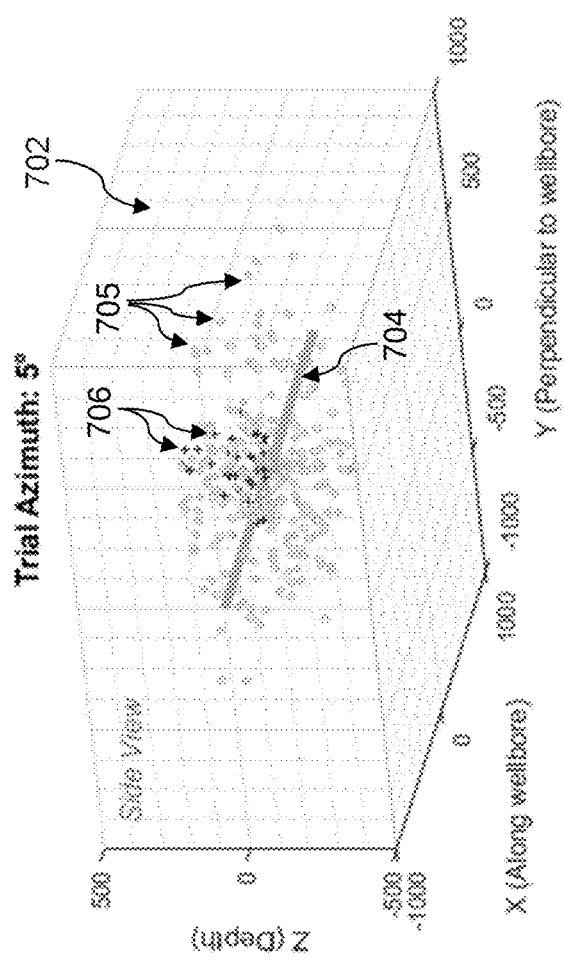
FIG. 7A
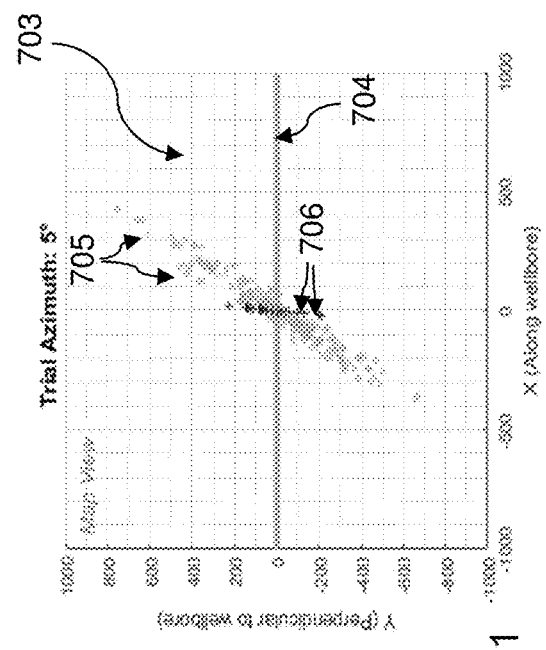
FIG. 7A1

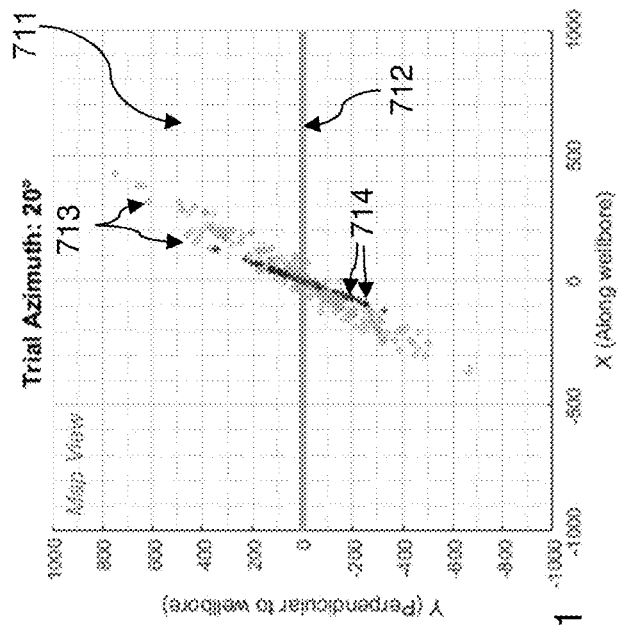
FIG. 7B1
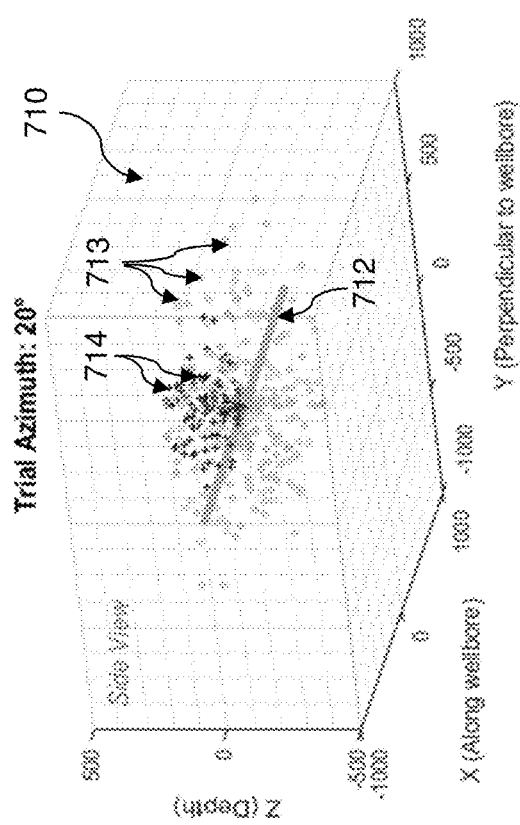
FIG. 7B

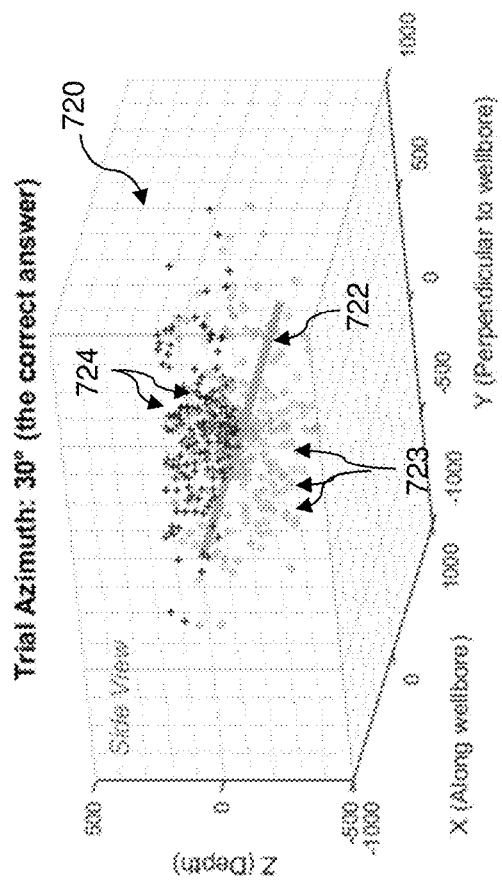
FIG. 7C
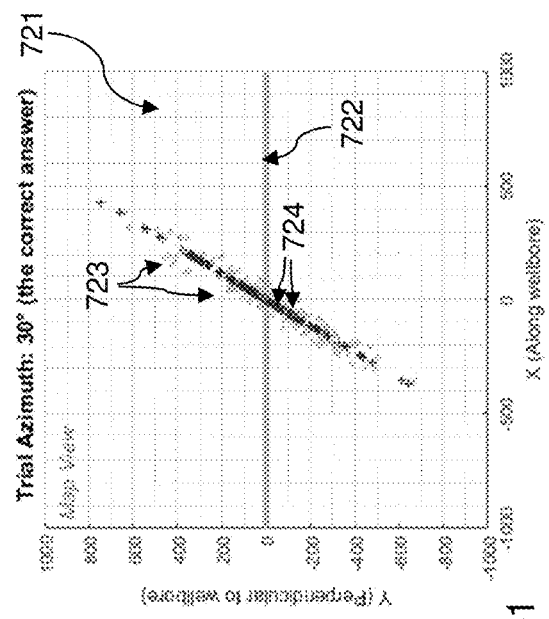
FIG. 7C1

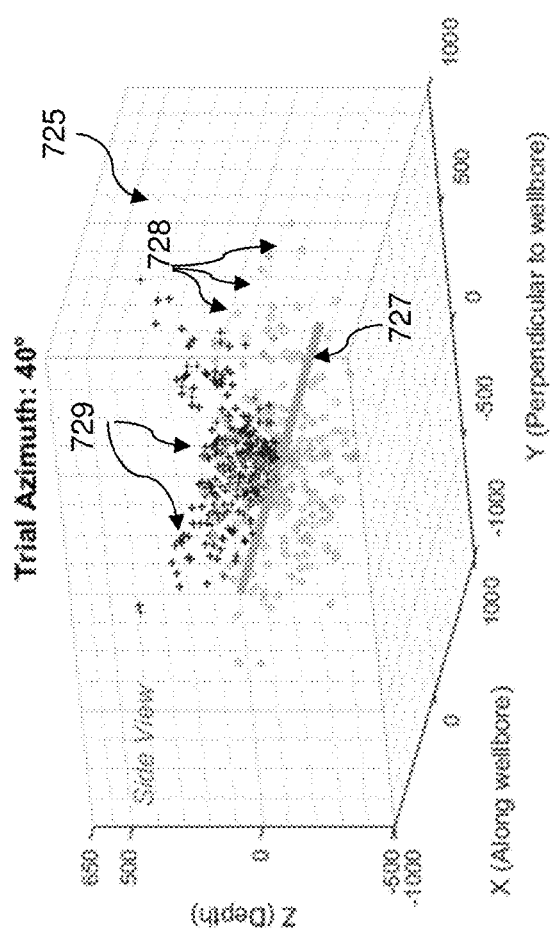
FIG. 7D
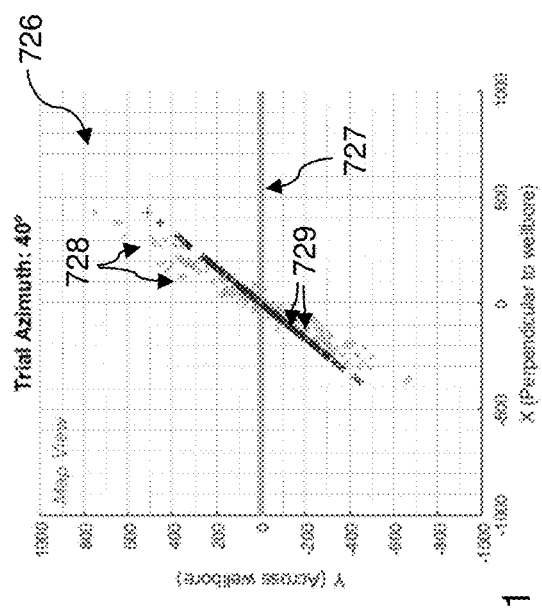
FIG. 7D1

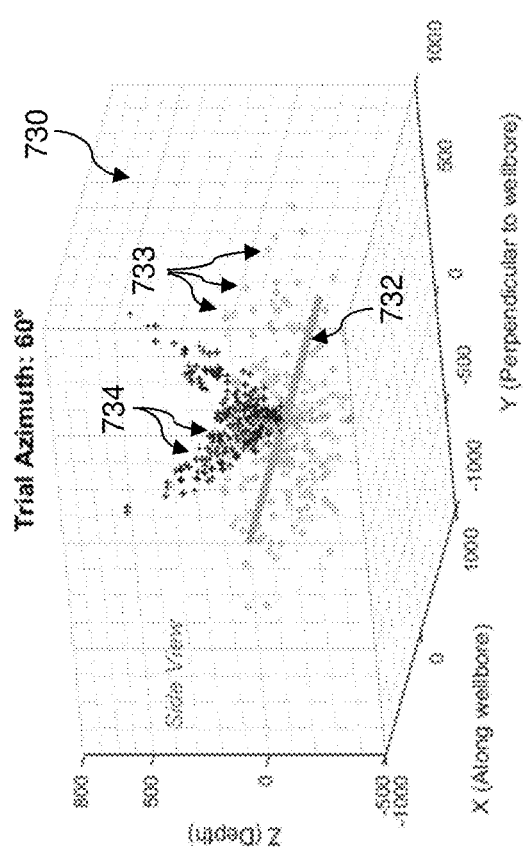
FIG. 7E
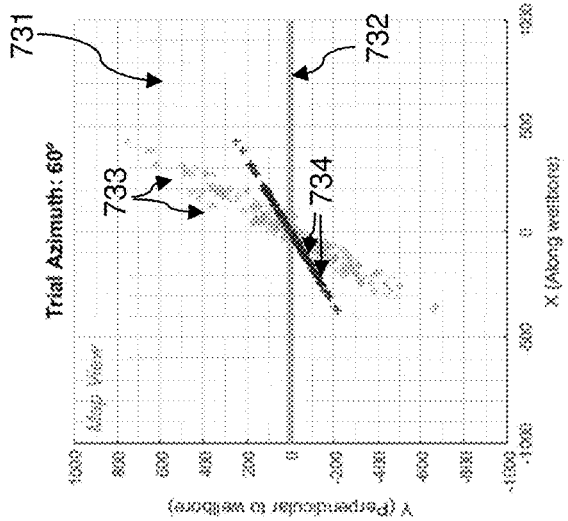
FIG. 7E1

SPATIALLY LOCATING A MICROSEISMIC EVENT UTILIZING AN ACOUSTIC SENSING CABLE

CROSS-REFERENCE TO RELATED APPLICATION

This application is the National Stage of, and therefore claims the benefit of, International Application No. PCT/US2018/059260 filed on Nov. 5, 2018, entitled "SPATIALLY LOCATING A MICROSEISMIC EVENT UTILIZING AN ACOUSTIC SENSING CABLE," which was published in English under International Publication Number WO 2020/096565 on May 14, 2020. The above application is commonly assigned with this National Stage application and is incorporated herein by reference in its entirety.

TECHNICAL FIELD

This application is directed, in general, to locating subsurface formation microseismic events, and more specifically, to utilizing an acoustic sensing cable to generate a three dimensional fracture model.

BACKGROUND

In the hydrocarbon production industry, there can be a need to identify and measure subsurface hydraulic fractures proximate to a borehole. Microseismic monitoring is often used to estimate the size and orientation of hydraulic fractures. Traditionally, the seismic sensors used for microseismic monitoring are geophones. Recently, fiber optic distributed acoustic sensing (DAS) cables are increasingly being used due to cost and operational advantages. Unlike geophone-based seismic sensing, which often requires drilling a dedicated (and non-producing) observation well to host the sensor array, a DAS cable can be deployed in any well, including the one that is being hydraulically fractured. The DAS method provides a longer sensing-aperture and a much denser spatial-sampling than most geophone arrays. It therefore has the potential to provide more-accurate positioning of microseismic events.

A major challenge with DAS microseismic monitoring can be that the DAS cable lacks broadside sensitivity in that it only records the component-of-motion that runs in the direction of the DAS cable. DAS cable cannot resolve the direction of incidence in the plane perpendicular to the cable. Consequently, when only a straight portion of a single acoustic sensing cable is available, the exact source-location of each microseismic event is undefined. What is known is that the true locations falls on a ring (or ring-like shape) around the fiber as opposed to a unique point in three dimensional (3D) space. By comparison, a conventional tri-axial geophone system is able to resolve the microseismic source-location to a singular position in 3D space due to its ability to resolve the directional polarization of seismic energy. This directional polarization is used to reduce the solution-space from a ring-shaped region to a single point. Due to the lack of directional polarization sensing in DAS, the interpretive value of DAS microseismic results are significantly reduced.

BRIEF DESCRIPTION

Reference is now made to the following descriptions taken in conjunction with the accompanying drawings, in which:

FIG. 3A is an illustration of a diagram of an example monitoring system demonstrating a microseismic event proximate to two portions of an acoustic sensing cable;

FIG. 6A is an illustration of a diagram of an example fracture plane intersecting an approximate ring of possible source-locations computed from the distance of a microseismic event from the acoustic sensing cable;

FIG. 6B is an illustration of a diagram of an example of a fracture plane intersecting an approximate ring of possible source-locations, similar to FIG. 6A, but presented in overhead view;

FIG. 6C is an illustration of a diagram of an example overhead view where a fracture plane does not intersect an approximate ring of possible source-locations;

Figure 8:
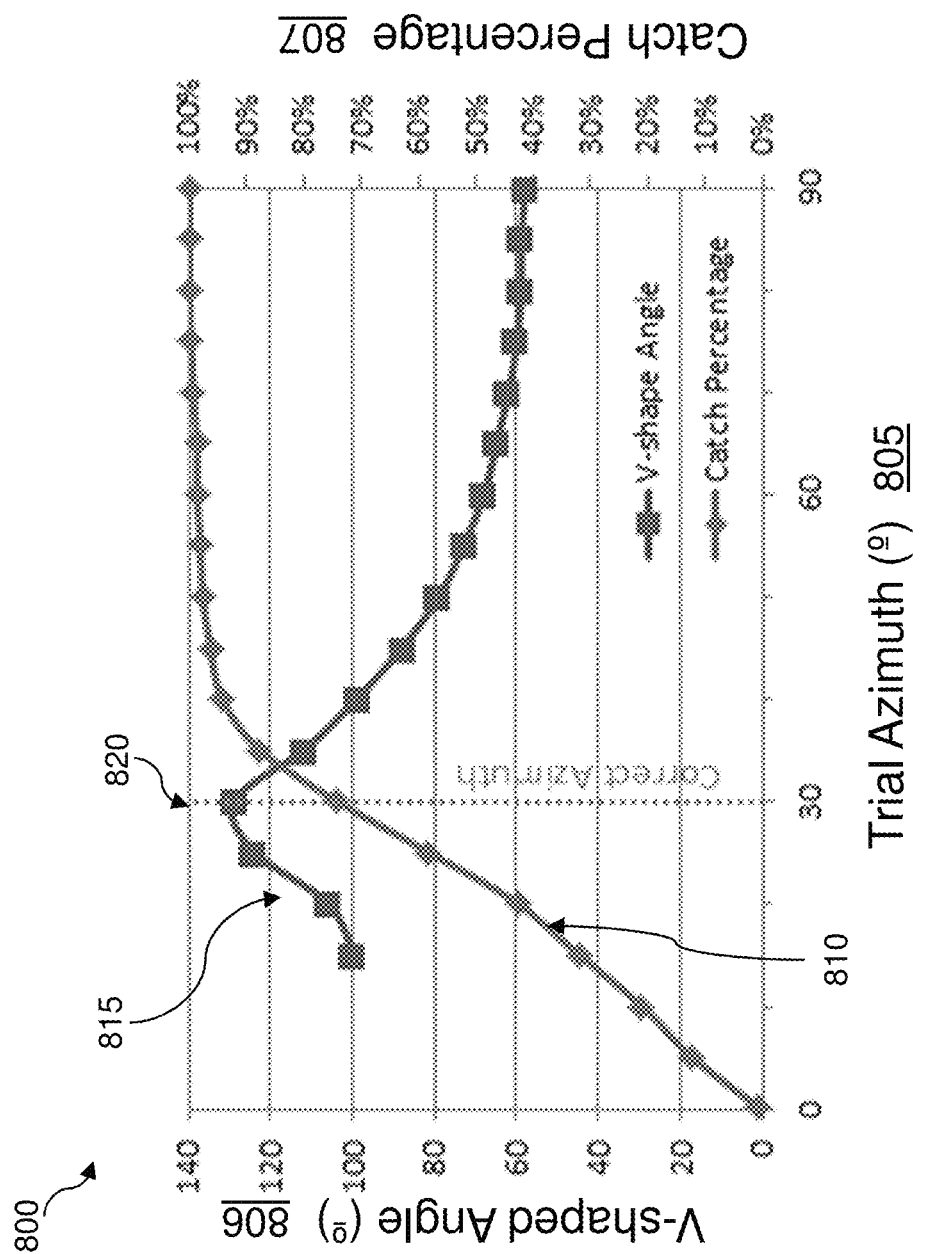
Figure 9:
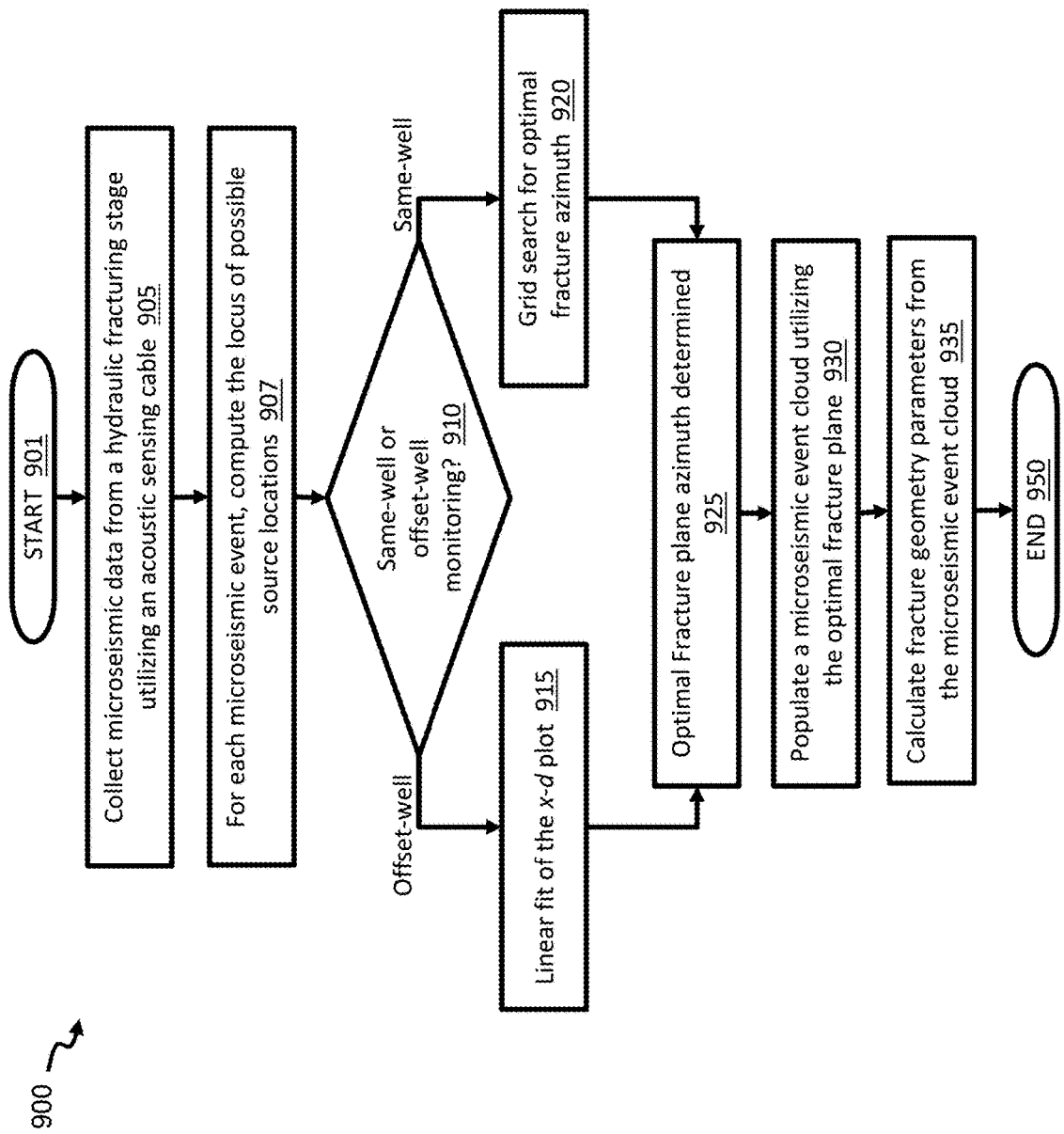
Figure 10:
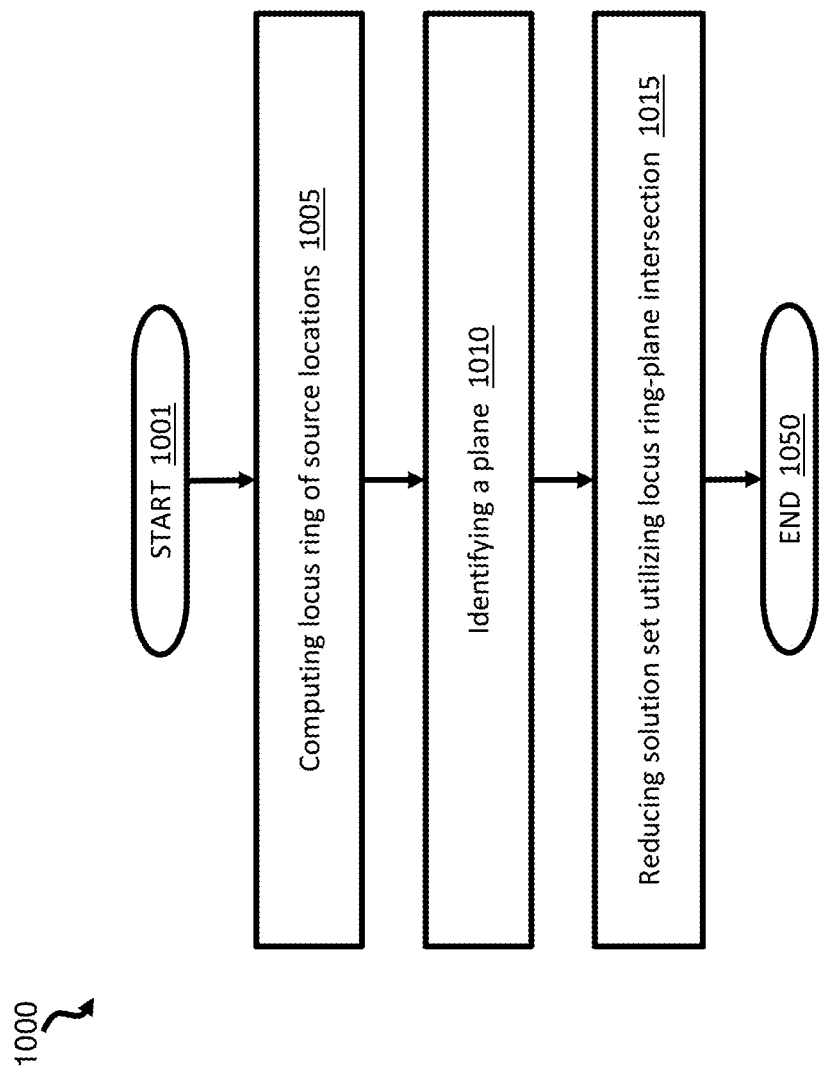
Figure 11:
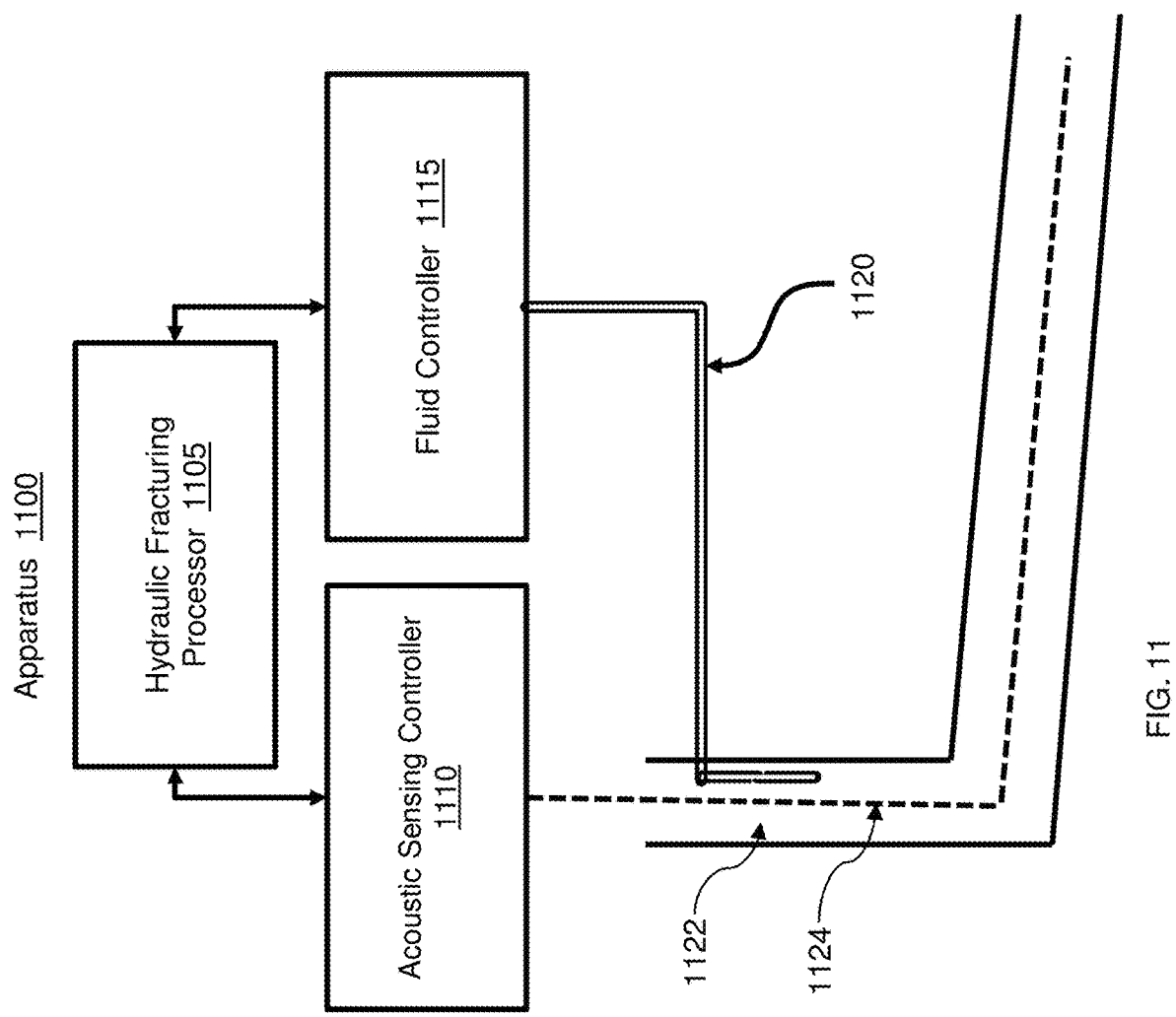
Figure 12:
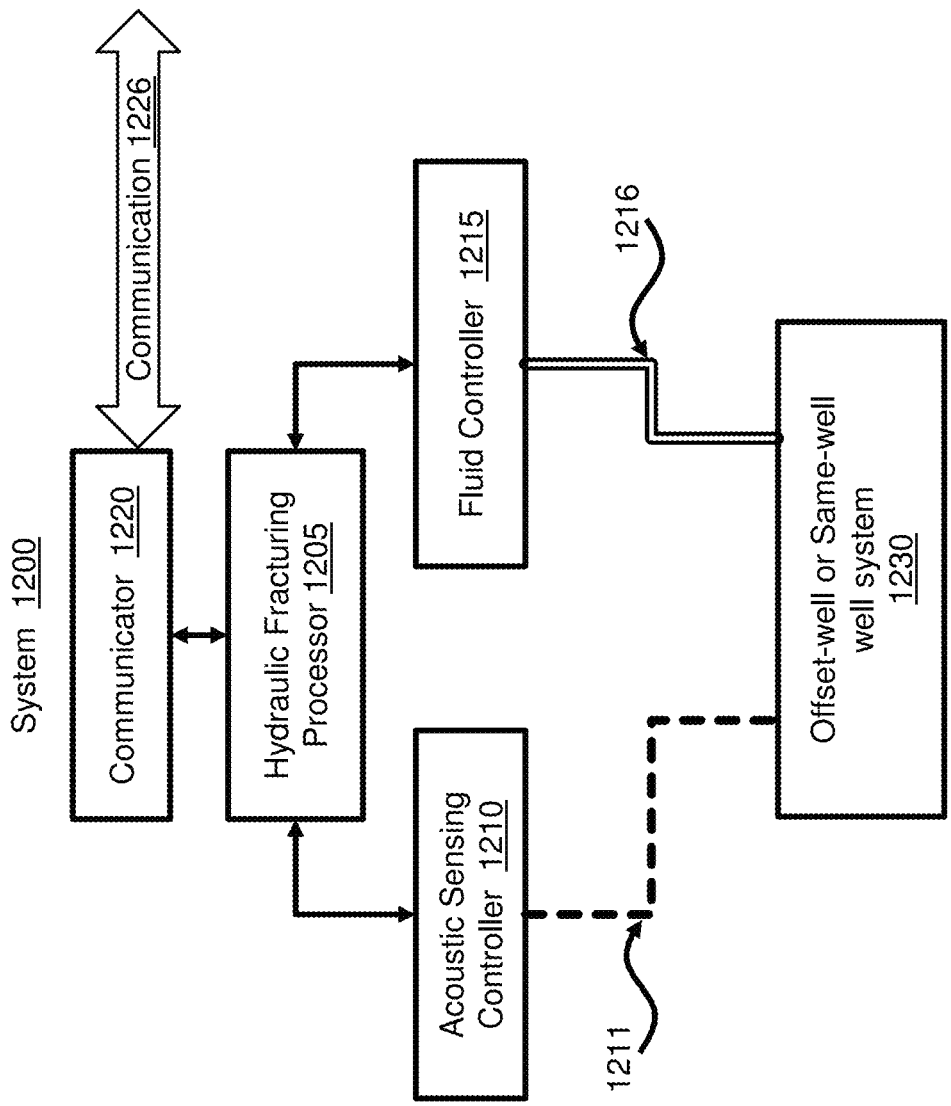

FIGS. 7A, 7B, 7C, 7D, and 7E are illustrations of charts of example source-locations obtained by trying various fracture plane orientations, plotted in three dimensions;

FIGS. 7A1, 7B1, 7C1, 7D1, and 7E1 are illustrations of charts of example overhead view, similar to FIGS. 7A, 7B, 7C, 7D, and 7E, of source-locations obtained by trying various fracture plane orientations;

FIG. 8 is an illustration of a chart of an example goodness of fit plot for various trial fracture planes;

FIG. 9 is an illustration of a diagram of an example method for utilizing a single acoustic sensing cable in varying well systems;

FIG. 10 is an illustration of a diagram of an example method for utilizing a single acoustic sensing cable to generate a solution set of source-locations;

FIG. 11 is an illustration of a diagram of an example single acoustic sensing cable apparatus; and FIG. 12 is an illustration of a diagram of an example single acoustic sensing cable system.

DETAILED DESCRIPTION

In the hydrocarbon production industry, certain well systems utilize a hydraulic fracturing process to enhance well production. Hydraulic fracturing (HF) is a well-stimulation technique in which pressurized fluid (primarily water, containing sand or other proppants) is injected into subsurface rock formations in order to create fractures, i.e., pathways for petroleum and/or natural gas to flow out more easily. Knowing how long, wide, and high a fracture is can be a useful diagnostic to know if the HF treatment is operating as intended. Additionally, fracture dimensions can be used to further optimize future HF treatments within the same or other wells. The dimensions can be used in conjunction with production modeling to estimate potential recoverable reserves associated with the well being treated.

During the HF process, the fluid injection can cause changes in stress in the subsurface, leading to the formation of fractures and the stress-induced failure of surrounding rock. Each sudden release of stress creates acoustic emissions which are seismic in nature. The majority of these emissions is very small, and are classified as "microseismic events" as they are generally too small in magnitude to be felt. Many of these microseismic events are detectable by conventional vibration sensors, such as geophones or accelerometers. Additionally, an acoustic sensing cable, deployed in a nearby well, can also be used to detect these microseismic events. One common kind of acoustic sensing cable is a fiber optic distributed acoustic sensing (DAS) cable.

The wavefield of seismic energy, released from a microseismic event, include a compressional wave (P-wave) and a shear wave (S-wave). Depending on the interaction between the seismic raypath and the stratigraphy around the well, these P-waves and S-waves can be received by the acoustic sensing cable as direct waves, reflected waves, and refracted waves. The arrival times of the P-waves and S-wave can be measured at points along the acoustic sensing cable. Given these arrival times, and an understanding of the rock properties (specifically the seismic velocity and velocity-anisotropy) in the region around the acoustic sensing cable, the source-location of the microseismic event can be computed. Only certain source-locations will create the P-wave and S-wave arrival times that are observed by the acoustic sensing cable. Computation of the most likely source-locations is performed by trial and error. After considering, potentially thousands, of source-locations, the best-matching source-location (or locations) are found. By mapping the source-locations of all microseismic events associated with a growing fracture, the approximate geometry of the fracture can be inferred.

Since the early 2000s, horizontal drilling has become a common practice in developing unconventional reserves. Horizontal wellbores can provide more efficient access to hydrocarbon rock formations than vertical wellbores. Horizontal wells can be hydraulically fractured in stages, where a stage can be associated with a segment or section of the wellbore. During each stage, fluid is injected into designated sections of the wellbore. This process typically creates a number of fractures within the rock that are oriented in a vertical plane which is perpendicular to the direction of minimum principal stress within the rock formation.

A stage of injection can have a duration of one to two hours. In other aspects, the duration can be shorter or longer. During the stage duration, HF induced microseismic events can be detected. The actual number of events detected can vary depending on the duration of the stage, the formation conditions, and other factors. It is common to detect 100 to 5000 microseismic events per stage. The actual number of microseismic events is a function of the geo-mechanical properties of the rock, the sensitivity of the monitoring system, the environmental noise, and the intensity of the HF treatment.

Traditionally, the seismic sensors used for microseismic monitoring are geophones. Recently, fiber-optic DAS has become attractive due to cost and operational advantages. While DAS is not the only kind of acoustic sensing cable, it is by far the most common. Other common acoustic sensing cables include fiberoptic cables with discrete (fiber Bragg grating) sensors, or piezoelectric hydrophone sensor cables.

An acoustic sensing cable can be installed in the HF wellbore, such as a same-well monitoring scenario, or in an adjacent well, such as an offset-well monitoring scenario. When a microseismic event occurs near the "heel" of the monitoring well, i.e., the general area where the vertical orientation portion of a well turns to a more horizontal orientation, seismic emissions (waves) from the microseismic event can be detectable on both the vertical and the horizontal portions of the acoustic sensing cable. The "L" shaped geometry allows for triangulation of the microseismic event source-location.

In contrast, when only the horizontal section of the cable is able to detect a microseismic event, the source-location of the microseismic event is highly non-unique. The P-wave and S-wave arrival times, observed on the acoustic sensing cable, can be created by a multitude of different source-locations. When the acoustic sensing cable is placed within a perfectly straight horizontal well, the set of plausible source-locations can only be determined to fall within a locus ring, i.e., a ring-shaped region of subsurface which has a high probability of containing the actual three dimensional (3D) position of the event. A specific point in 3D space cannot be determined.

This locus ring surrounds the fiber at a singular point along the fiber and the plane of the ring is perpendicular to the fiber at that point. This representative ring shape can be described by two parameters—the distance along the acoustic sensing cable to the centre of the ring, and the distance outward from the acoustic sensing cable to points along the ring, i.e., ring radius. There is only one true source-location, but its position within the locus ring is unknown due to the lack of knowledge of the seismic wavefield's directional polarization.

Since the 3D source-location of each individual microseismic event cannot be uniquely mapped, the subsequent step of identifying fracture geometry parameters from the microseismic event cloud is jeopardized. When the subsurface contains layers or regions with different rock velocities or material properties, the shape of the locus ring may include radius-discontinuities or warping, but the locus will generally retain a ring-like aspect.

This disclosure relates to a method of inferring the 3D locations, i.e., spatial locality, of microseismic events and calculating fracture geometry parameters, (i.e., properties, such as fracture azimuth, fracture half-length, fracture height, and microseismic cloud width), utilizing only a largely-straight segment of a single DAS cable, or more generally, an acoustic sensing cable. Although the source-location of each individual microseismic event is highly non-unique due to the directional ambiguity of acoustic sensing cables, it can be assumed, through previous experimentation and verification, that the bulk of microseismic events in the same HF stage, are associated with one, or a limited number of, fracture(s) and are therefore spatially-correlated. This correlation can be utilized to reduce the non-uniqueness in the source-location of each individual microseismic event and to derive the shape of the microseismic event cloud in 3D, allowing for identification of the fracture geometry parameters.

A catch percentage parameter can be utilized to determine the correlation. The catch percentage represents the percentage of microseismic events that can be associated with a fracture plane. There can be outlier microseismic events that are not associated with the fracture plane. Typically, a catch percentage parameter can be 70%. Other catch percentage parameters can be used.

Once the optimum, i.e., best fit, fracture plane azimuth(s) is determined, a 3D microseismic event cloud can be populated. For the locus rings that intersect with the fracture plane, the intersection can be one point, e.g., tangential, or two points. This technique can result in a cloud that is planar and not volumetric. Fracture geometry parameters, such as half-length and height, can be measured on this planar cloud of source-locations. In one aspect of this disclosure, the microseismic cloud-width is assumed to be zero. Computed this way, the half-length and height can be slightly overestimated. This error can be minimal while the true microseismic cloud width is small compared to the fracture parameter length or height. This is typically a safe assumption to make through previous experience.

Alternatively, the microseismic cloud width can be estimated by taking the maximum of the distances between the microseismic events' locus rings to the fracture plane. It is equivalent to gradually increasing the thickness of the fracture plane, thereby creating a representative fracture cuboid, until all microseismic events are encompassed, i.e., when the catch percentage parameter reaches 100.0%.

After the microseismic cloud width is determined, the 3D event cloud can be recomputed, since each microseismic event's locus ring now intersects a cuboid rather than a fracture plane. The resulting potential solutions form a continuous arc rather than one or two discrete points. One method to create discrete points can be to randomly choose a point from the candidate arc as the source-location of that microseismic event. Even though the source-location of individual microseismic events determined this way can differ from its actual source-location, the overall shape of the resulting microseismic event cloud can remain an acceptable approximation of the actual microseismic event cloud.

In an alternative aspect, the same (primary) methodology can be applied to a subset, instead of the entirety, of available microseismic events. The subset can be defined by different attributes, such as, a common computed seismic attribute, (e.g., event origin-time, magnitude, P-wave/S-wave amplitude ratio, and moment tensor solution), a common derived attribute, (e.g., distance from a subterranean feature, and cloud shape), and association with a particular phase of a HF fluid treatment plan, (e.g., portion of a well operation plan).

Another aspect can include a more complex locus shape, compared to utilizing a representative locus ring, in the 3D space. For example, when a non-homogeneous seismic velocity model is used for locating microseismic events, the resulting locus of solutions i.e., trajectory of possible source-locations, of each event can take on a more complex shape in 3D than a ring. The vertical fracture plane would intersect the complex-shaped locus in the same way as it intersects the ring. Such a non-homogeneous seismic velocity model can include complex stratigraphy, in which each layer is assigned unique seismic propagation properties, e.g., P-wave velocity, S-wave velocity, and anisotropy.

In another aspect, a-priori and independent information about the fracture plane can be utilized to assist or constrain the process of determining the optimal fracture plane. For example, knowledge of the regional stress orientation and dominant fracture plane orientation from a previously completed HF can be used to limit the search range for fracture azimuth.

Figure 1:
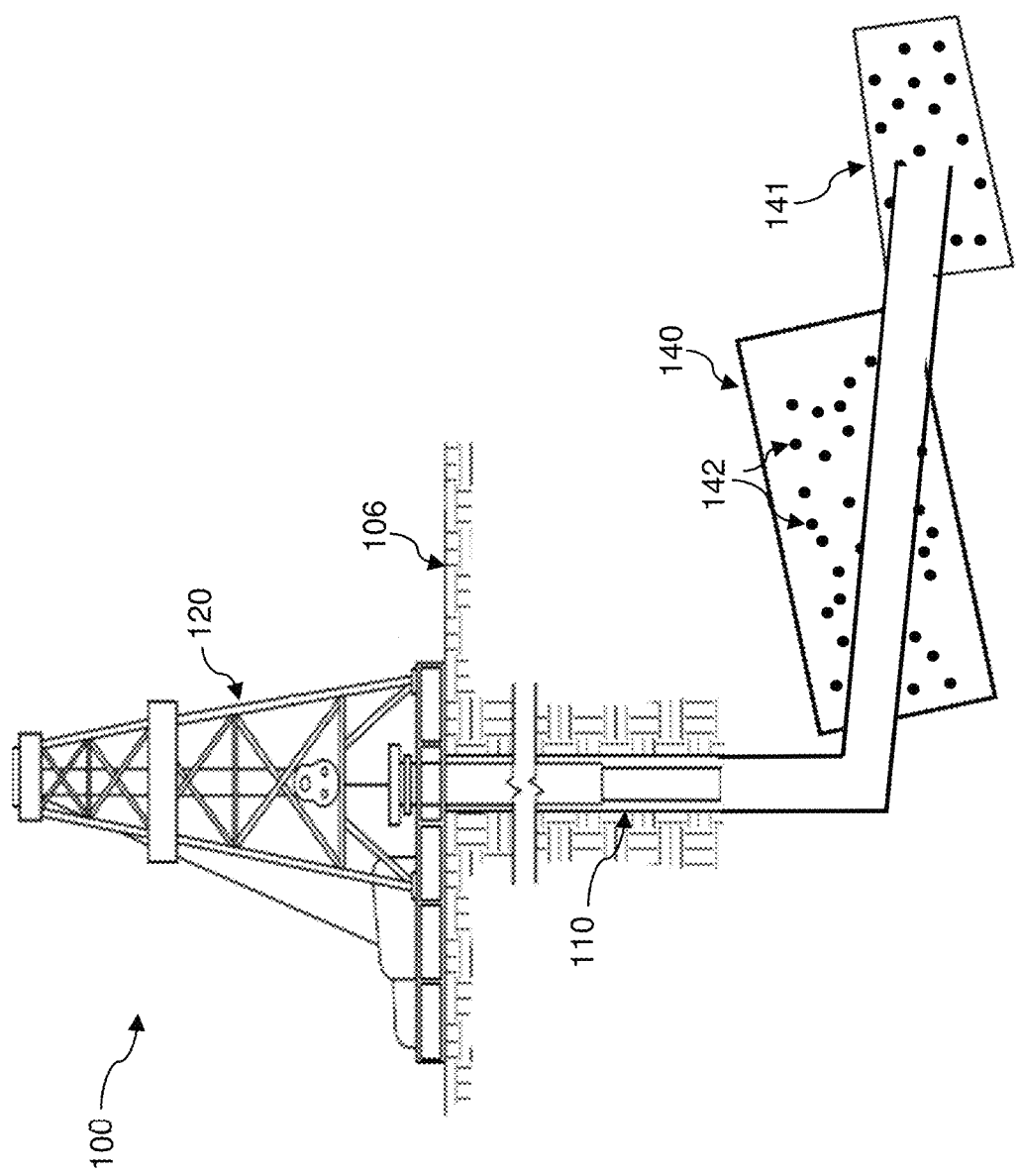
FIG. 1 is an illustration of a diagram of example hydraulic fractures and associated microseismic events detected during a hydraulic fracturing (HF) process.

Turning now to the figures, FIG. 1 is an illustration of a diagram of an example HF well system 100. Determining the location and orientation of subsurface fractures is important information for the well operation plan. Well system 100 includes well equipment 120 located at a surface location 106, a borehole 110, and communicatively coupled to well equipment 120. Well system 100 is a HF treatment well. Well system 100 demonstrates two hydraulic fractures 140 and 141. Hydraulic fractures are assumed to be bi-wing; only one wing is drawn in the example well system 100. The fracture geometry of each of the hydraulic fractures 140 and 141 are calculated using the detection of microseismic events, such as microseismic events 142. Microseismic events 142, when viewed collectively, form a microseismic event cloud from which the fracture geometry of hydraulic fracture 140 can be calculated.

Figure 2A:
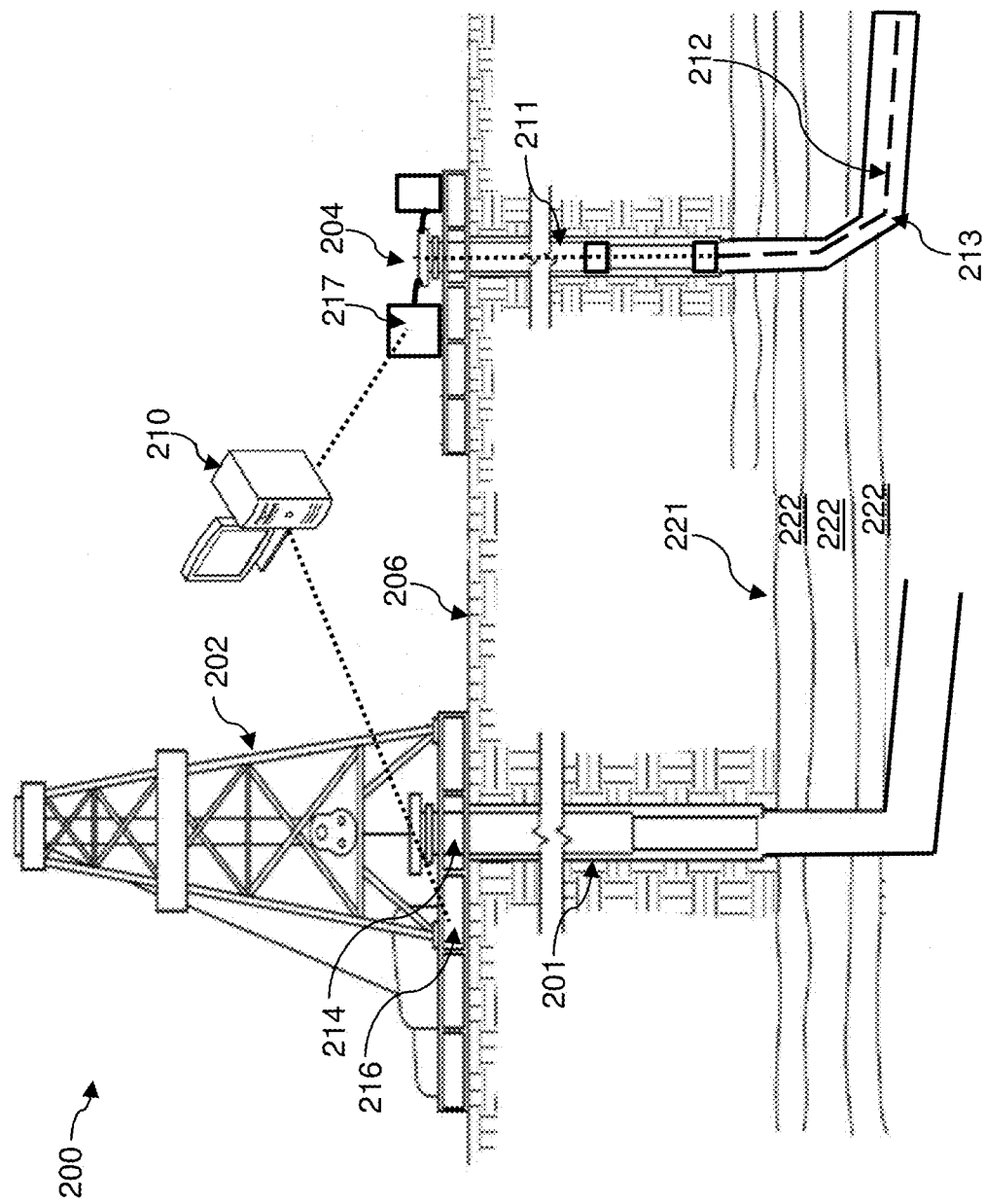
FIG. 2A illustrates a system diagram of an example offset-well monitoring system utilizing a single acoustic sensing system.

FIG. 2A illustrates a system diagram of an example offset-well monitoring system 200. The example offset-well monitoring system 200 includes a treatment well 202, i.e., hydraulic fracture well, and an observation well 204. In proximity to treatment well 202 is a well system controller 216 and injection fluid pump system 214. Treatment well 202 includes a borehole 201 extending beneath a surface 206. Observation well 204 includes an acoustic sensing controller 217, borehole 211, and a single acoustic sensing cable 212 inserted into borehole 211 and communicatively and optically coupled to an acoustic sensing controller 217. Offset-well monitoring system 200 also includes a computing subsystem 210, communicatively coupled to well system controller 216 and acoustic sensing controller 217. The acoustic sensing cable 212 can be located in a portion of the borehole 211, or the entire length of borehole 211.

The observation well 204 can be located remotely from the treatment well 202, near the treatment well 202, or at another suitable location, as long as the sensing equipment in observation well 204 can detect the microseismic events generated in treatment well 202. Borehole 211 can, but does not need to, include a bend from a generally vertical orientation to a generally horizontal orientation, identified as heel 213.

The offset-well monitoring system 200 can include one or more additional treatment wells, observation wells, and other well systems. The computing subsystem 210 can include one or more computing devices or systems located at the treatment well 202, at the observation well 204, or in other locations. The computing subsystem 210, and one or more sub-components, can be located apart from the other components shown in diagram 200. For example, the computing subsystem 210 can be located at a data processing center, a computing facility, and other suitable locations.

The offset-well monitoring system 200 can include additional or different features, and the features of the offset-well monitoring system 200 can be arranged as shown in diagram 200 and in other suitable configurations. The example treatment well 202 includes a borehole 201 in a subsurface zone 221 beneath the surface 206. In the example shown, the subsurface zone 221 includes various subsurface layers 222. The subsurface layers 222 can be defined by geological or other properties of the subsurface zone 221.

The well system controller 216 and pump 214 can apply a fluid treatment plan to the subsurface zone 221 through the borehole 201. The injection treatment can be a HF treatment that fractures the subsurface zone 221. For example, the injection treatment may initiate, propagate, or open fractures in one or more of the subsurface layers 222. A fracture treatment may include a mini fracture test treatment, a regular or full fracture treatment, a follow-on fracture treatment, a re-fracture treatment, a final fracture treatment, and other fracture treatments. The fracture treatment can pump in an injection fluid into, or pump out an injection fluid out of, the subsurface zone 221 at any suitable fluid pressure and fluid flow rate. Injection fluids can be pumped above, at, or below a fracture initiation pressure, above, at, or below a fracture closure pressure, or at other suitable combinations of these and other injection fluid pressures. A fracture treatment can be applied by any appropriate system, using any suitable technique.

The HF, i.e., fracture treatment, as well as other activities and natural phenomena, can generate microseismic events in the subsurface zone 221, and microseismic data can be collected from the subsurface zone 221. For example, the microseismic data can be collected by a single acoustic sensing cable 212 inserted in observation well 204. The microseismic information detected in the offset-well monitoring system 200 can include acoustic/seismic waves generated by natural phenomena, acoustic/seismic waves associated with a fracture treatment applied through the treatment well 202, or other seismic waves. For example, the acoustic sensing cable 212 can detect acoustic/seismic waves generated by rock slips, rock movements, rock fractures, and other snap, crackle, and pop events in the subsurface zone 221. Microseismic events in the subsurface zone 221 can occur, for example, along or near induced hydraulic fractures. The microseismic events can be associated with pre-existing natural fractures or hydraulic fracture planes induced by fracturing activities. In some environments, the majority of detectable microseismic events can be associated with shear-slip rock fracturing. Such events can correspond to induced tensile hydraulic fractures that have significant width generation.

The computing subsystem 210 can include a processor and analyzer component capable of analyzing microseismic data collected in the offset-well monitoring system 200. For example, the computing subsystem 210 can analyze microseismic data from a fracture treatment of the subsurface zone 221. Microseismic data from a fracture treatment can include data collected before, during, and after fluid injection. The computing subsystem 210 can receive the microseismic data at any suitable time. In some instances, the computing subsystem 210 receives the microseismic data in real time (or substantially in real time) during the fracture treatment. For example, the microseismic data may be sent to the computing subsystem 210 immediately upon detection by the acoustic sensing cable 212. In some instances, the computing subsystem 210 receives some or all of the microseismic data after the fracture treatment has been completed.

The computing subsystem 210 can receive the microseismic data in various suitable formats. For example, the computing subsystem 210 can receive the microseismic data in a format produced by microseismic sensors or detectors, or the computing subsystem 210 can receive the microseismic data after the data has been formatted, packaged, or otherwise processed. The computing subsystem 210 can receive the microseismic data by any suitable means. For example, the computing subsystem 210 can receive the microseismic data by a wired or wireless communication link, by a wired or wireless network, or by one or more disks or other tangible media.

Some of the techniques and operations described herein may be implemented by a computing subsystem 210 configured to provide the functionality described. In various aspects, a computing device may include various types of devices, including, but not limited to, personal computer systems, desktop computers, laptops, notebooks, mainframe computer systems, handheld computers, workstations, tablets, application servers, storage devices, cloud data centers, or other types of computing or electronic devices.

Figure 2B:
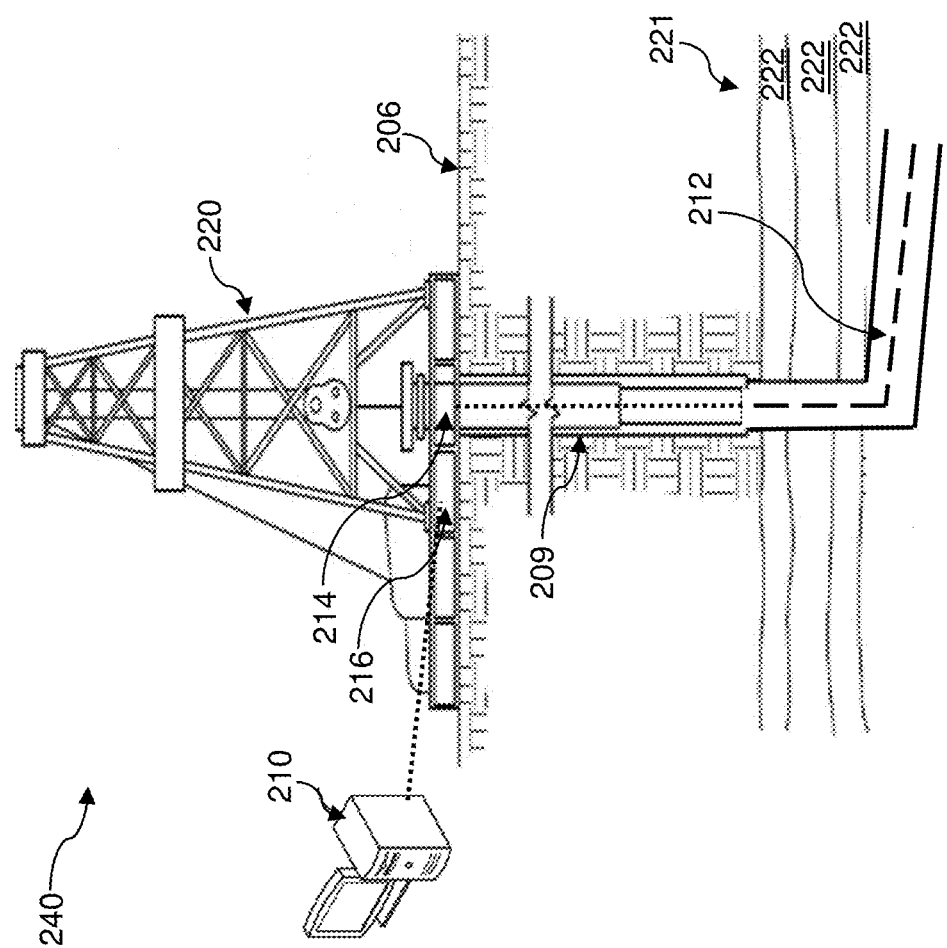
FIG. 2B illustrates a system diagram of an example same-well monitoring system utilizing a single acoustic sensing system.

FIG. 2B illustrates a system diagram of an example same-well monitoring system 240 utilizing a single acoustic sensing system. Similar to diagram 200, diagram 240 includes a well system 220, a well system controller 216, an injection fluid pump controller 214, a computing sub-system 210, borehole 209, and single acoustic sensing cable 212. In this example, acoustic sensing controller 217, from diagram 200, is included in the well system controller 216. In alternative aspects, acoustic sensing controller 217 can be a separate component. In this example same-well monitoring system 240, the treatment well and the observation well are the same borehole. The operation of the well system is similar to that of diagram 200.

FIG. 3A is an illustration of a diagram of an example monitoring system 300 demonstrating a microseismic event proximate to two portions of a single acoustic sensing cable. Monitoring system 300 is demonstrating a simplified well system including well equipment 306 located proximate to a surface 305. Extending into a borehole located subsurface of surface 305, is a single acoustic sensing cable 310. In this example, a microseismic event has taken place and has been detected by two sections (a vertical section and a horizontal section) of the single acoustic sensing cable 310. An analysis of the microseismic data for each section, such as the P-wave and S-wave propagation times, can determine that the true source-location of the microseismic event falls on a locus ring 324 and a locus ring 334. Locus ring 324 is centered on a point 320 with a computed radius of radius 322. Locus ring 334 is centered on a point 330 with a computed radius of radius 332. Center points 320 and 330 are positioned on the single acoustic sensing cable. The microseismic event has occurred proximate to the heel of the borehole, so the microseismic event is detectable by the vertical and horizontal portions of the single acoustic sensing cable 310.

The intersection of locus rings 324 and 334 occur at one or two points 341. A one point intersection can occur if locus ring 324 and locus ring 334 are tangential. Since both sections of the single acoustic sensing cable can detect the microseismic event, the possible source-location can be reduced to the intersection points 341, e.g., at most two possibilities.

Figure 3B:
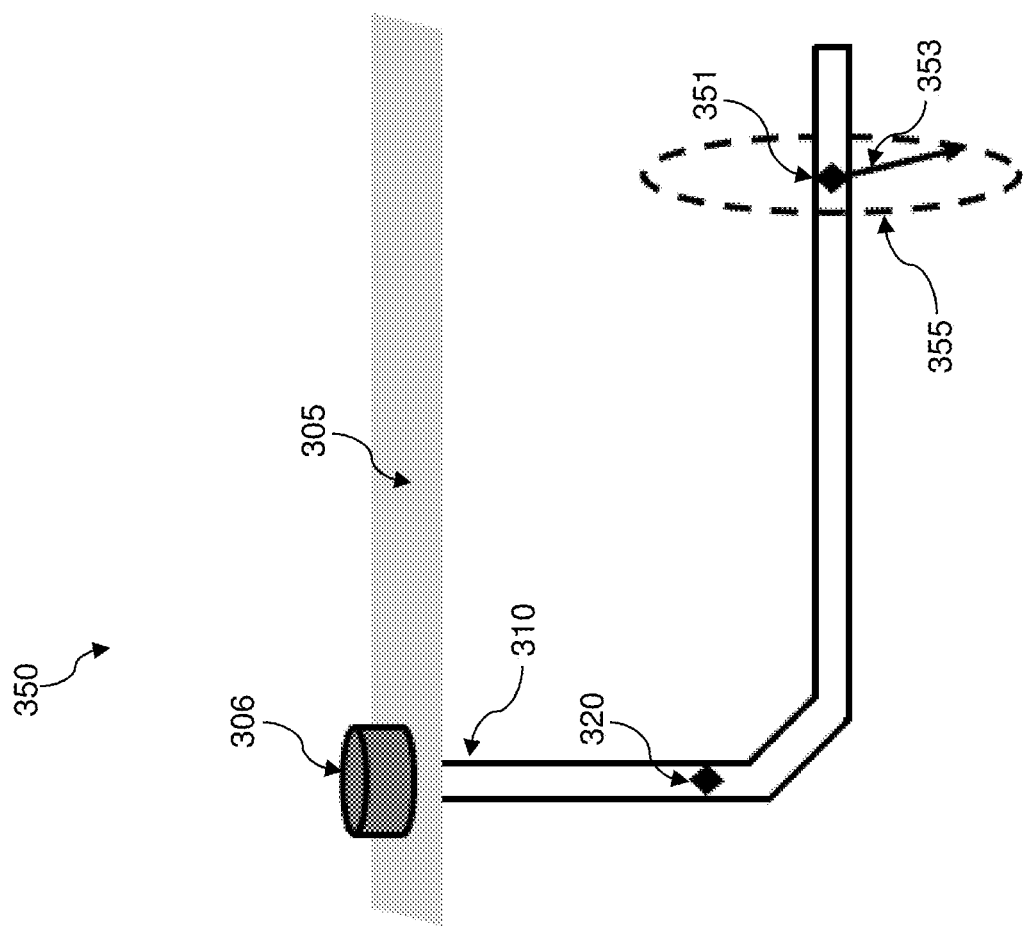
FIG. 3B is an illustration of a diagram of an example monitoring system demonstrating a microseismic event proximate to one portion of an acoustic sensing cable.

FIG. 3B is an illustration of a diagram of an example monitoring system 350 demonstrating a microseismic event proximate to one portion of a single acoustic sensing cable. Monitoring system 350 is demonstrating a simplified well system similar to monitoring system 300, including well equipment 306, located proximate to surface 305, and a single acoustic sensing cable 310 located subsurface to surface 305. In this example, a microseismic event is not detectable by the vertical section of the fiber due to remote distance. The microseismic event is detectable by a portion of the horizontal section of the fiber. Similar to monitoring system 300, a center point 351 and a radius 353 can be determined using the acoustic data received by the single acoustic sensing cable 310. A locus ring 355 can be calculated using the center point 351 and the radius 353. Locus ring 355 represents the approximate source-location of the microseismic event. Since there is no intersection of calculated locus rings in this example, the non-uniqueness or ambiguity of source-location cannot be further reduced. The possible source-locations remain in the approximate locus ring 355, where the locus ring 355 is perpendicular to the single acoustic sensing cable 310.

Figure 4A:
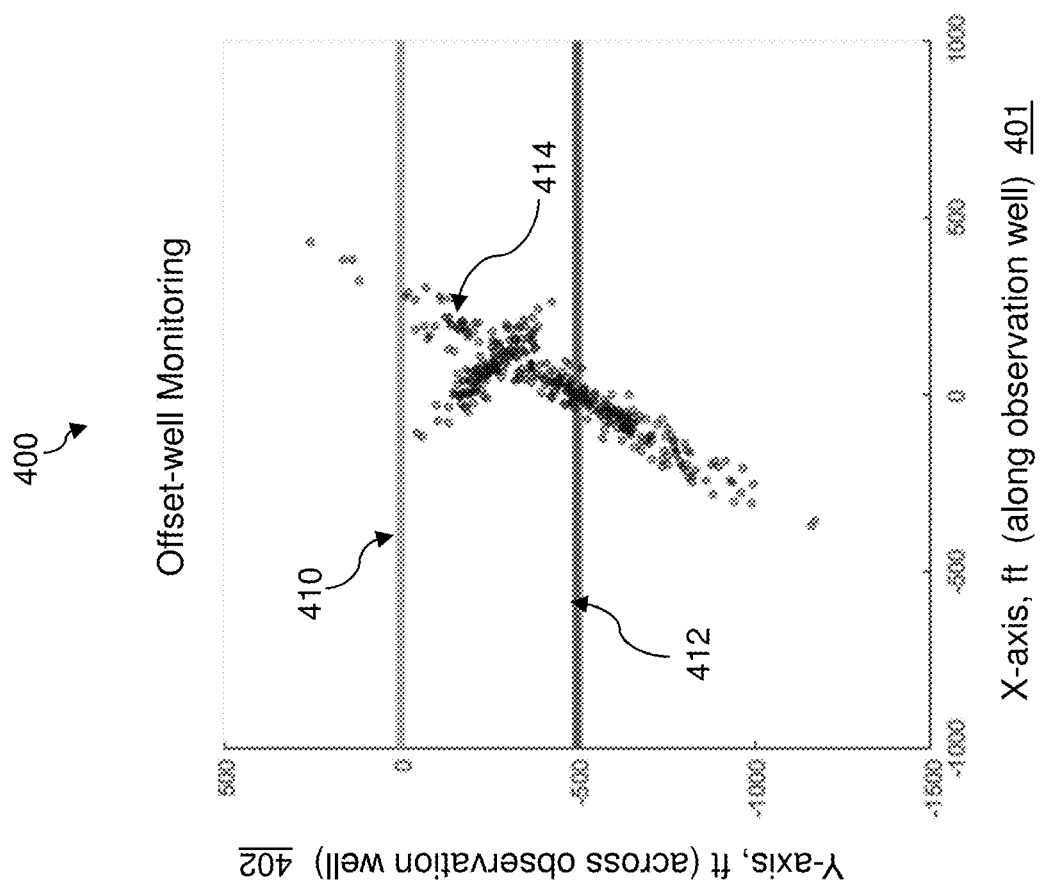
FIG. 4A is an illustration of a chart of an example overhead view of microseismic event plot for an offset-well monitoring system.

FIG. 4A is an illustration of a chart of an example overhead view of microseismic event chart 400 for an offset-well monitoring system. Chart 400 includes an x-axis 401, a y-axis 402, the observation well trajectory 410, fractured (treatment) well trajectory 412, and overhead view of source-locations 414 of microseismic events generated by a computer simulation assuming two planar fractures of distinct positions and orientations. Chart 400 is demonstrating an example well system where the treatment well 412 borehole is approximately 500 feet from the observation well 410 borehole. In other aspects, the distance between the two wells can vary throughout their lengths, while the process remains the same.

The x-axis 401 is the distance along the single acoustic sensing cable. The length of the x-axis can be equal to the length of the single acoustic sensing cable, while in other aspects, the x-axis can be longer. In this example, an arbitrary point on the x-axis was identified as the 0.0 foot mark with the relative (absolute value) x distance increasing in both directions from the 0.0 foot mark. The y-axis 402 is the horizontal offset-distance from the observation well (containing the acoustic sensing cable) to the fracture well. The 0.0 foot mark of the y-axis 402 is defined as being at the observation well 410 line, i.e., at the single acoustic sensing cable.

Figure 4B:
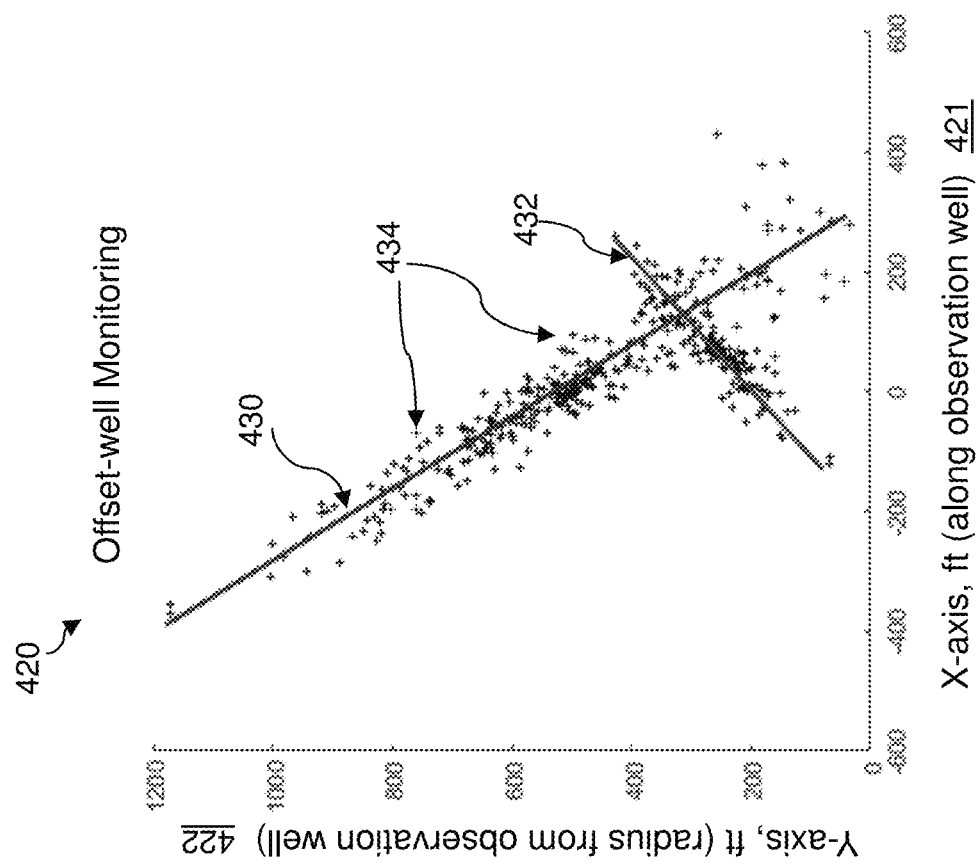
FIG. 4B is an illustration of a chart of an example microseismic event two dimensional (2D) source-location plot for an offset-well monitoring system and best fit fracture planes.

FIG. 4B is an illustration of a chart of an example microseismic event chart 420 for an offset-well monitoring system showing two-dimensional (2D) source-locations and best fit fracture planes. Chart 420 includes an x-axis 421, a y-axis 422, 2D source-locations 434, and two fracture planes 430 and 432. The x-axis 421 is a measurement of the distance along the single acoustic sensing cable, i.e., the same as the x-axis 401 in FIG. 4A. The y-axis 422 is the radius from the single acoustic sensing cable, denoted as d. The 2D source-location of each microseismic event is represented as a point (x, d) on Chart 420, where x is the center, and d the radius, of the locus ring, as shown in FIG. 3B, of the microseismic event. They are calculated from the P-wave and S-wave propagation times associated with the microseismic event. When only the horizontal portion of the acoustic sensing cable is able to detect the microseismic event, FIG. 4B can be generated, and FIG. 4A cannot be determined.

Chart 420 is demonstrating a linear fit of two fracture planes, 430 and 432, on the 2D source-locations. This example shows that there are two fractures present in the subsurface formation, and it shows the likely 3D positioning of the fractures utilizing the collection of 2D source-locations. Chart 420 is demonstrating a 2D chart. A 3D chart using the data can be created to represent the fracture positioning within the subsurface formation. The fracture planes 430 and 432 may not exactly match the fracture azimuths as they exist in the subsurface formation, for example, the projected fracture planes can be 3-5° (degrees) different than the actual fracture azimuths. The fractures planes 430 and 432 can be within an acceptable error deviation of the well system operation plan.

In the offset-well system, the bulk of microseismicity is away from the observation well 410. The fracture azimuth(s) can be derived directly from the x-d plot of source-locations 434 via a linear regression algorithm.

Fracture azimuth(s) can be directly measured from the x-d plot because for offset-well systems, |y| (the absolute value of y) is much greater than |z|, where y is the overhead view distance of the microseismic event source-location across the acoustic sensing fiber and z is the vertical depth of the microseismic event source-location minus the depth of the fiber, $|y| \gg |z|$ therefore, $d = \sqrt{y^2+z^2} \approx |y|$, therefore the x-d plot is a good approximation of the x-y plot so long as the sign of y is disregarded.

Figure 5A:
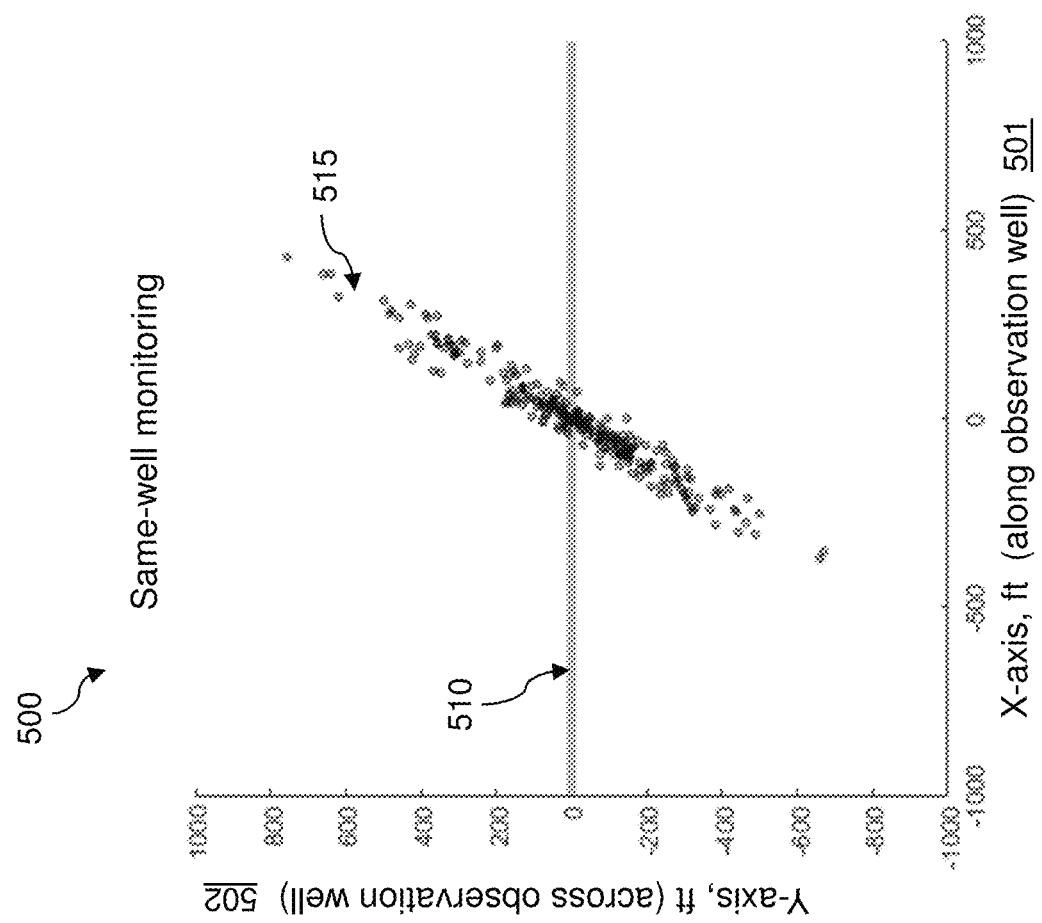
FIG. 5A is an illustration of a chart of an example overhead view of microseismic event plot for a same-well monitoring system.

FIG. 5A is an illustration of a chart of an example overhead view of microseismic event chart 500 for a same-well monitoring system. Chart 500 includes an x-axis 501, a y-axis 502, a well line 510, and overhead view of source-locations 515 of microseismic events generated by a computer simulation assuming one planar fracture with a certain azimuth. In the same-well system, the fracture (treatment) well borehole and the observation well borehole are the same borehole. Similar to chart 400, the x-axis 501 is an axis matching the orientation of the single acoustic sensing cable inserted in the borehole. An arbitrary point has been marked as the 0.0 foot mark with relative (absolute value) x distances increasing in both directions. Similarly, the y-axis 502 is the relative distance from the single acoustic sensing cable. Overhead view of source-locations 515 are shown plotted on chart 500.

Figure 5B:
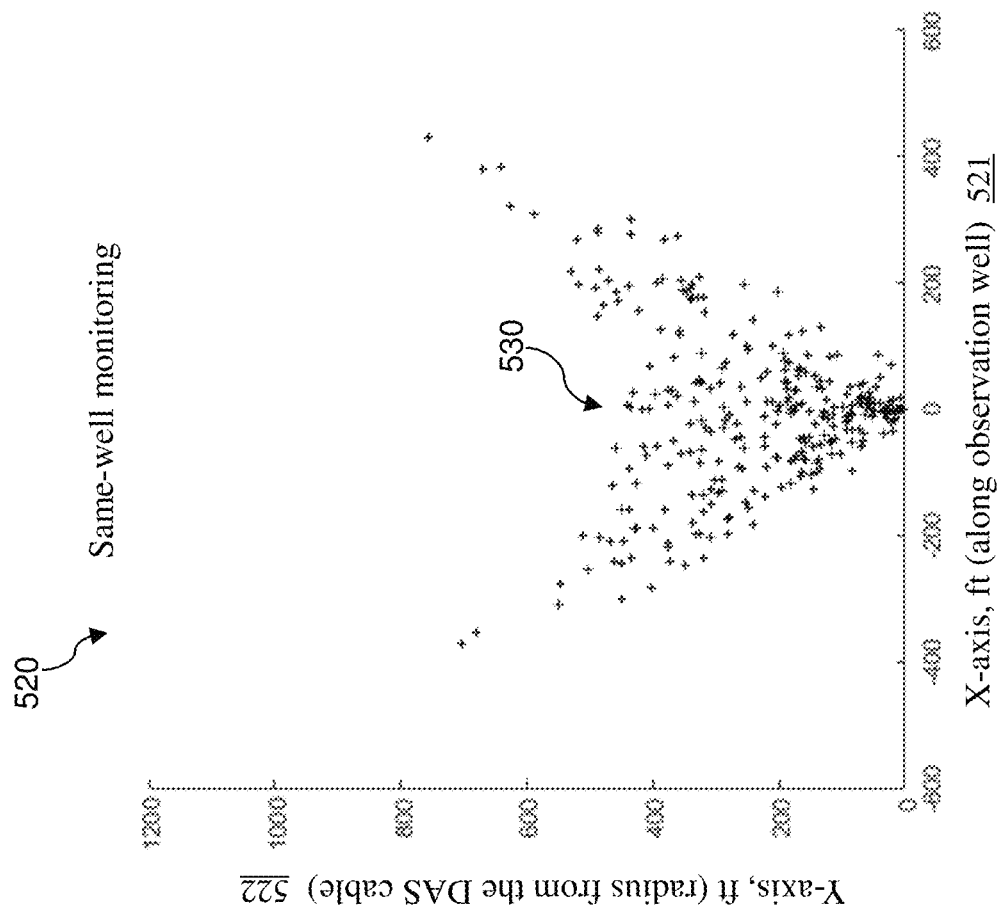
FIG. 5B is an illustration of a chart of an example microseismic event 2D source-location plot for a same-well monitoring system.

FIG. 5B is an illustration of a chart of an example microseismic event chart 520 for a same-well monitoring system showing the 2D source-locations. Chart 520 includes an x-axis 521, a y-axis 522, and 2D source-locations 530 plotted on the chart 520. As before, x-axis 521 has an arbitrary point marked as the 0.0 foot mark with relative (absolute value) increasing distances in both directions. The y-axis, since this is a distance plot, shows the 0.0 foot mark at the bottom of the chart 520. The source-locations 530 plotted on this chart 520 do not show a linear arrangement, such as that on chart 420. A fracture plane azimuth cannot be easily determined through a visual inspection of the 2D source-locations.

FIG. 6A is an illustration of a diagram of an example fracture plane model 600 demonstrating a fracture plane intersecting the locus ring of a microseismic event. Fracture plane model 600 includes single acoustic sensing cable 605, inserted into a borehole. A microseismic event is detected by the horizontal section of the acoustic sensing cable 605. A locus ring 612 of possible source-locations of the microseismic event can be calculated from an analysis of the seismic waves reaching the single acoustic sensing cable 605, such as calculated from the P-wave and S-wave propagation times. The locus ring 612 forms a radius 613 from a point 610 on the single acoustic sensing cable 605, i.e., the center of the locus ring 612. A trial, i.e., assumed, fracture plane 614 is superimposed on the locus ring 612. There is a fracture initiation point 615 where the assumed fracture plane 614 intersects with the single acoustic sensing cable 605. Fracture plane model 600 is represented with one wing of a bi-wing fracture model. Locus ring 612 intersects with assumed fracture plane at points 617 and 618. This can effectively reduce the possible source-locations of the microseismic event to two points from the locus ring 612.

FIG. 6B is an illustration of a diagram of an example overhead view 630, similar to FIG. 6A, of an assumed fracture plane intersecting the locus ring of a microseismic event. Overhead view 630, i.e., map view, includes a single acoustic sensing cable 605. A microseismic event is detected by the single acoustic sensing cable 605. Utilizing the seismic wave parameters received, an approximate radius 613 from the acoustic sensing cable 605 can be determined. The center point 610 of locus ring 612 and radius 613 can be used to generate locus ring 612 for the possible source-locations of the microseismic event. An assumed fracture plane 614, with a determined azimuth angle α 620, intersects the single acoustic sensing cable 605 at a point 615.

Assumed fracture plane 614, in this example, intersects the locus ring 612 at a point 617 (and a second point hidden by the overhead view perspective). Multiple assumed fracture planes can be projected onto the diagram with a varying azimuth angle α.

The assumed fracture plan 614 is oriented utilizing the azimuth angle α. Depending on the azimuth angle α, the number of intersection points between the assumed fracture plane 614 and the locus ring 612 can be two, one or zero. The intersection point 617 (and the hidden second point) can then be identified in 3D space, thereby confirming, or rejecting, the assumed fracture plane 614.

FIG. 6C is an illustration of a diagram of an example overhead view 660 where a fracture plane does not intersect an approximate ring of possible source-locations. The overhead view 660 is similar to overhead view 630. Elements 605, 610, 612, and 613 remain the same. Assumed fracture plane 630 intersects single acoustic sensing cable 605 at a point 632. Assumed fracture plane 630 has a smaller azimuth angle α 634 when compared to assumed fracture plane 614. Assumed fracture plane 630 does not intersect the locus ring 612. Overhead view 660 demonstrates an assumed fracture plane 630 that is not likely to be the correct assumed fracture plane since it fails to intersect the locus ring 612. Assumed fracture plane 630 would result in a low catch percentage parameter.

In a same-well system, the azimuth angle α cannot be directly obtained from the x-d plot, because the conditions $|y|\gg|z|$ and $d=\sqrt{y^2+z^2}\approx|y|$ do not hold true. Instead, the azimuth angle α can be derived via a grid search algorithm. A grid search over potential fracture azimuth angles α is conducted. For each α, a vertical fracture plane, such as plane 614, is defined. For each microseismic event, the locus ring of potential source-locations 612, centered at location 610, is cut by the intersecting vertical fracture plane. Each microseismic event's 3D location is reduced from infinite possibilities to (at most) two, one above, or at, and the other below, or at, the vertical depth of the single acoustic sensing cable. The solution set can be further reduced to simplify the analysis by, without loss of generosity, selecting the one above, or at, the vertical depth of the single acoustic sensing cable, i.e., $z\geq0$. Thus, a discrete 3D event cloud can be generated for each value of α (see FIGS. 7A-7E and 7A1-7E1 for a visual representation of discrete 3D event clouds that can be generated).

When the trial azimuth angle α is smaller than the actual fracture plane azimuth (see FIGS. 7A and 7B), some microseismic events are not captured by the assumed vertical fracture plane as their locus rings are too far from the plane. The catch percentage parameter can be a function of the trial azimuth angle α. The farther off the azimuth angle α, the lower the catch percentage parameter.

When the trial fracture plane azimuth angle α is greater than the actual fracture plane azimuth (see FIGS. 7D and 7E), the catch percentage parameter is high; however the two ends of the 3D event cloud bend upward, forming a "V" or bird-wing shaped pattern. The farther off the azimuth, the more pronounced the representative V-shaped visual artifact. An acceptable azimuth angle α can therefore be identified by combining the two diagnostics, i.e., catch percentage and the degree of V-shaped artifact.

FIGS. 7A, 7B, 7C, 7D, and 7E are illustrations of charts of example source-locations obtained by trying various fracture plane orientations, plotted in 3D. These charts, for demonstration purposes, have been generated by a computer simulation assuming one planar fracture, with an azimuth of 30°, is present in the subsurface location. FIGS. 7A1, 7B1, 7C1, 7D1, and 7E1 are overhead views of FIGS. 7A, 7B, 7C, 7D, and 7E.

FIG. 7A shows a 3D chart 702 of a trial fracture plane azimuth at 5.0°. The azimuth is the angle α, for example, demonstrated by element 620 in FIG. 6B. The horizontal section of the acoustic sensing cable is shown by line 704. The true 3D source-locations of the microseismic events, i.e., the true microseismic event cloud, is shown by the light gray circles 705 (similar to element 515 in FIG. 5A). In reality, the true azimuth value and the true microseismic event cloud are unknown, but here the true cloud is plotted for the purpose of verifying the grid search method. FIG. 7A1 shows a 2D chart 703 for the trial fracture plane azimuth at 5.0°, where the azimuth is the angle α.

The calculated 3D source-locations of microseismic events, i.e., the calculated microseismic event cloud, are shown by the dark gray plus symbols 706. The 3D source-location of each individual microseismic event is calculated by intersecting the trial fracture plane (not shown) with the locus ring of that microseismic event (see the method as described in FIGS. 6A-6C). A microseismic event is considered successfully caught by the trial fracture plane if the plane intersects the event's locus ring at one or more points, and otherwise if the trial plane fails to intersect with the event's locus ring. The catch percentage parameter is then defined as the ratio between the number of successfully caught events and the total number of microseismic events. The catch percentage parameter is low, as shown by the fact that the number of successfully caught microseismic events (dark gray plus symbols 706) is few compared to the total number of microseismic events (light gray circles 705). In this example, the catch percentage is approximately 10%.

FIG. 7B shows a 3D chart 710 of a trial fracture plane azimuth at 20.0°. The azimuth is the angle α, for example, demonstrated by element 620 in FIG. 6B. The horizontal section of the acoustic sensing cable is shown by line 712 (equivalent to line 704 in FIG. 7A). The true 3D source-locations of the microseismic events, i.e., the true microseismic event cloud, is shown by the light gray circles 713 (equivalent to the light gray circles 705 in FIG. 7A, and similar to element 515 in FIG. 5A). The calculated 3D source-locations of microseismic events, i.e., the calculated microseismic event cloud, are shown by the dark gray plus symbols 714.

The 3D source-location of each individual microseismic event is calculated by intersecting the trial fracture plane (not shown) with the locus ring of that microseismic event (see the method as described in FIGS. 6A-6C). The catch percentage parameter of source-locations is shown as higher than for chart 702, as shown by an increase in the number of dark gray plus symbols 714. In this example, the catch percentage is approximately 40%. FIG. 7B1 shows a 2D chart 711 for the trial fracture plane azimuth at 20.0°, where the azimuth is the angle α, for example, demonstrated by element 620 in FIG. 6B.

FIG. 7C shows a 3D chart 720 of a trial fracture plane azimuth at 30.0°. The azimuth is the angle α, for example, demonstrated by element 620 in FIG. 6B. The horizontal section of the acoustic sensing cable is shown by line 722 (equivalent to line 704 in FIG. 7A). The true 3D source-locations of the microseismic events, i.e., the true microseismic event cloud, is shown by the light gray circles 723 (equivalent to the light gray circles 705 in FIG. 7A and similar to element 515 in FIG. 5A). The calculated 3D source-locations of microseismic events, i.e., the calculated microseismic event cloud, are shown by the dark gray plus symbols 724.

The 3D source-location of each individual microseismic event is calculated by intersecting the trial fracture plane (not shown) with the locus ring of that microseismic event (see the method as described in FIGS. 6A-6C). The catch percentage parameter is shown as higher than for charts 702 and 710, as shown by an increase in the number of dark gray plus symbols. In this example, the catch percentage is above 70%. FIG. 7C1 shows a 2D chart 721 for the trial fracture plane azimuth at 30.0°, where the azimuth is the angle α, for example, demonstrated by element 620 in FIG. 6B.

FIG. 7D shows a 3D chart 725 of a trial fracture plane azimuth at 40.0°. The azimuth is the angle α, for example, demonstrated by element 620 in FIG. 6B. The horizontal section of the acoustic sensing cable is shown by line 727 (equivalent to line 704 in FIG. 7A). The true 3D source-locations of the microseismic events, i.e., the true microseismic event cloud, is shown by the light gray circles 728 (equivalent to the light gray circles 705 in FIG. 7A and similar to element 515 in FIG. 5A).

The calculated 3D source-locations of microseismic events, i.e., the calculated microseismic event cloud, are shown by the dark gray plus symbols 729. The 3D source-location of each individual microseismic event is calculated by intersecting the trial fracture plane (not shown) with the locus ring of that microseismic event (see the method as described in FIGS. 6A-6C). The catch percentage parameter is high, at approximately 95%. The two ends of the event cloud start to bend upward, forming a "V" or bird wing shaped pattern, which is unreal, contradicting the prediction of geomechanical model as well as the normal shapes of microseismic event cloud observed in reality. FIG. 7D1 shows a 2D chart 726 for a trial fracture plane azimuth at 40.0°, where the azimuth is the angle α, for example, demonstrated by element 620 in FIG. 6B.

FIG. 7E shows a 3D chart 730 of a trial fracture plane azimuth at 60.0°. The azimuth is the angle α, for example, demonstrated by element 620 in FIG. 6B. The horizontal section of the acoustic sensing cable is shown by line 732 (equivalent to line 704 in FIG. 7A). The true 3D source-locations of the microseismic events, i.e., the true microseismic event cloud, is shown by the light gray circles 733 (equivalent to the light gray circles 705 in FIG. 7A and similar to element 515 in FIG. 5A). The calculated 3D source-locations of microseismic events, i.e., the calculated microseismic event cloud, are shown by the dark gray plus symbols 734.

The 3D source-location of each individual microseismic event is calculated by intersecting the trial fracture plane (not shown) with the locus ring of that microseismic event (see the method as described in FIGS. 6A-6C). The catch percentage parameter is high, reaching nearly 100%. The two ends of the event cloud bend upward significantly, forming a "V" or bird wing shaped pattern, which is unreal, contradicting the predictions of geomechanical model as well as the normal shapes of microseismic event cloud observed in reality. The "V" or bird wing shape artifact is more pronounced than for chart 725 and 720, as shown by the grouping of dark gray plus symbols 734 forming a sharper "V" shape angle. FIG. 7E1 shows a 2D chart 731 for a trial fracture plane azimuth at 60.0°, where the azimuth is the angle α, for example, demonstrated by element 620 in FIG. 6B.

FIG. 8 is an illustration of a chart of an example "goodness of fit" chart 800 for various trial fracture plane azimuths. Chart 800 includes an x-axis 805, primary y-axis 806, secondary y-axis 807, calculated catch percentage parameter values 810, calculated microseismic event cloud V-shaped angles 815, and a determined optimum point 820. The fracture geometry parameters can be plotted on chart 800. In this example, trial (potential) fracture plane azimuths vary by 5.0°. In other aspects, other azimuth degree variations can be utilized, for example, 2.0° and 8.0°.

For each of the trial fracture plane azimuths, the catch percentage parameter can be plotted, shown by example as line 810. For each of the trial fracture plane azimuths, the calculated microseismic event cloud V-shaped angles can be plotted, shown by example as line 815. A minimum catch percentage parameter can be specified, such as 70.0%. Utilizing the specified minimum catch percentage parameter, the largest, i.e., most obtuse, V-shape angle on line 815 can be identified. That largest representative angle is likely the optimum fracture plane azimuth for the actual fracture plane, shown as optimum point 820. In other aspects, the calculated microseismic event cloud can contain outliers and more complex fracture geometries can be represented. In these cases, a lower catch parameter and a less stringent V-shape angle parameter can be used to identify the actual fracture plane azimuth.

In the above described examples, demonstrated through FIGS. 4A, 4B, 5A, 5B, 6A, 6B, 7A-7E, 7A1-7E1, and 8, 2D and 3D charts and diagrams were utilized. These charts are for the visual representation of the geometry and source-locations collected. In other aspects, the described process can be implemented as part of a computing processing system where the analysis occurs as a data computing process without a visual representation component. The computing implemented process can include a visual representation component. The visual representation component can be similar to or different from what is described herein.

FIG. 9 is an illustration of a diagram of an example method 900 for utilizing an acoustic sensing cable in varying well systems. Method 900 begins at a step 901 and proceeds to a step 905 where microseismic data from a hydraulic fracturing stage is collected by an acoustic sensing cable. Proceeding to a step 907, for each microseismic event, the locus, i.e., the collection of all possible source-locations, is computed. The shape of the locus can be a ring, identified by a center x along the fiber and a radius d from the fiber. The (x, d) values from all microseismic events can be plotted as an x-d plot, such as shown in FIG. 4B. In other aspects, the locus can be one or more complex shapes in 3D space.

Proceeding to a decision step 910, the process determines if the microseismic data were collected in an offset-well or same-well monitoring system. In the offset-well monitoring system, the fracture treatment well and observation well are distinct and separated by a gap of a certain size. In the same-well monitoring system, the fracture treatment well is observed from within the treatment well, or from a distinct well which is close enough that the microseismic events will overlap both the treatment well and observation well. If the decision step 910 determines that this is an offset-well, then the method proceeds to a step 915. In a step 915, a linear fit algorithm of the x-d plot is implemented. If decision step 910 determines that this is a same-well, then the method proceeds to a step 920 to implement a grid search algorithm.

From step 915 and step 920, the method 900 proceeds to a step 925 where an optimal fracture plane is determined. Proceeding to a step 930, the 2D locus ring of each microseismic event is intersected with the optimal fracture plane to populate a 3D microseismic event cloud. Proceeding to a step 935, fracture geometry parameters, (i.e., half-length, height, and cloud width), can be derived utilizing the 3D microseismic event cloud. The method 900 ends at a step 950.

FIG. 10 is an illustration of a diagram of an example method 1000 for utilizing a single acoustic sensing cable to generate a solution set of source-locations. The method 1000 starts at a step 1001 and proceeds to a step 1005. In a step 1005, the locus ring, representing a set of 3D positions of potential source-locations, is computed for at least one acoustic emission source-location from the collection of acoustic emission data. The locus ring can be computed using the arrival times of the acoustic emissions (P-waves and S-waves) as they reach the single acoustic sensing cable from the acoustic emission source-location. In a step 1010, a plane, i.e., a fracture plane, is identified. Proceeding to a step 1015, the locus ring of source-locations is reduced to one or two values utilizing the locus ring-fracture plane intersection. The plane can either be tangent to the locus ring at a single point or it can intersect the locus ring at two points. The method 1000 ends a step 1050.

FIG. 11 is an illustration of a diagram of an example single linear acoustic cable apparatus 1100 for a same-well system, capable of initiating a HF and detecting microseismic events. The apparatus also applies to an offset-well system. Apparatus 1100 includes a borehole 1122, a single acoustic sensing cable 1124, a HF processor 1105, an acoustic sensing controller 1110, a fluid controller 1115, and a fluid pipe 1120. HF processor 1105 can be one or more components capable of receiving commands and data, and sending instructions and information to other systems. HF processor 1105 can be communicatively coupled to an acoustic sensing controller 1110 and fluid controller 1115. HF processor 1105 can instruct the controllers 1110 and 1115 to execute commands and to collect data.

Acoustic sensing controller 1110 is optically, electrically, or communicatively coupled to single acoustic sensing cable 1124. For optical sensing systems, acoustic sensing controller 1110 can initiate a light source to generate an optical signal through single acoustic sensing cable 1124 and to receive a return optical signal through single acoustic sensing cable 1124. For electrical sensing systems, acoustic sensing controller 1110 can supply power to acoustic sensors within the acoustic sensing cable 1124 and receive a return electrical or communicative readings from the sensors within the cable. Single acoustic sensing cable 1124 can be one or more of a general single acoustic sensing cable, a coherent Rayleigh interrogator cable, cable coated or treated with a material to enhance acoustic sensitivity, cable containing fiber Bragg grating reflectors, and cable including other enhancements and sensors to improve detection capabilities. Single acoustic sensing cable 1124 may also contain discrete acoustic sensing sensors such as hydrophones.

Fluid controller 1115 is connected to fluid pipe 1120. Fluid pipe 1120 extends partially or fully into borehole 1122. Fluid controller 1115 is capable to pump injection fluid into, and out of, borehole 1122 or a portion/section of borehole 1122. Fluid controller 1115 is also capable of changing the injection fluid pressure.

The components of apparatus 1100 can be combined or separated into one or more components. For example, in an alternative aspect, acoustic sensing controller 1110 can be combined with HF processor 1105. Other combinations are possible as well.

FIG. 12 is an illustration of a diagram of an example single acoustic sensing cable system 1200, operable to execute a HF process. System 1200 includes a HF processor 1205, acoustic sensing controller 1210, fluid controller 1215, communicator 1220, and a well system 1230. The components described can be combined or separated into one or more components, for example, in some aspects, the acoustic sensing controller 1210 and communicator 1220 can be combined with HF processor 1205, or these components can be included in a computing sub-system. Other combinations are possible as system 1200 demonstrates one possible implementation of the system functionality. HF processor 1205 and communicator 1220 can be partially or fully represented by the computing subsystem 210, shown in FIG. 2A.

HF processor 1205 can provide commands, instructions, and information to the other components, as well as receive data and information. Acoustic sensing controller 1210 can receive commands and instructions from HF processor 1205 and can control and generate a light source. Acoustic sensing controller 1210 can be optically connected to single sensing cable 1211 and its light source can be utilized to send optical signals through the cable 1211. Cable 1211 can be inserted into a borehole that is part of well system 1230. Acoustic sensing controller 1210 can also receive optical signals from cable 1211. Alternatively, acoustic sensing controller 1210 can receive electrical measurements from discrete electronic acoustic sensors within the cable 1211. Acoustic sensing controller 1210 can interpret the received signals and communicate the interpreted information to HF processor 1205. Alternatively, acoustic sensing controller 1210 can communicate a digital signal, utilizing the received optical or electrical signal, to the HF processor 1205, where the digital signal data is communicating the received optical or electrical signal data.

Fluid controller 1215 can be fluidly connected to fluid pipe 1216 and communicatively coupled to HF processor 1205. Fluid pipe 1216 can extend from the fluid controller 1215 and be inserted partially or fully into a borehole that is part of well system 1230. Well system 1230 can comprise of one or more boreholes. Single sensing cable 1211 and fluid pipe 1216 can be inserted into the same or different borehole. Fluid controller 1215 can control injection fluid parameters, such as, how the injection fluid is pumped into, and out of, the borehole, the temperature of the injection fluid, the pressure applied to the injection fluid pumping action, and other parameters.

As acoustic sensing controller 1210 collects the received microseismic event source-locations from single sensing cable 1211, acoustic sensing controller 1210 can communicate the information in real-time, near real-time, delayed time, and in batch mode to hydraulic fracturing processor 1205. HF processor 1205 can utilize this information to adjust the commands and instructions issued to the other components. In some aspects, the HF processor 1205 can be supplemented by a human operator to assist in interpreting the collected source-locations.

HF processor 1205 can utilize the microseismic event source-locations collected to calculate fracture geometry parameters. There can be one or more sets of fracture geometry parameters. For example, there can be two or more fractures in the subsurface formation that generate microseismic events, and various combinations of subsets of source-locations can be utilized, such as computed attributes, derived attributes, and operational plan phases. This analyzed information can be communicated by HF processor 1205 to communicator 1220.

Communicator 1220 can be communicatively coupled, through communication 1226, to one or more of a computing device (computer, laptop, mobile device, server, and other device types), a network (private network, public network, Ethernet, TCP/IP, and other types of networks), a data storage system (database, hard disk, memory device, cloud storage, and other data storage device types), a display device (monitor, printer, and other display device types), and other electronic equipment (other well system controllers, equipment, and other well system associated devices).

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:
A. A method to utilize an acoustic sensing cable, inserted in a first borehole, to spatially locate, in a three dimensional (3D) space, positions of a collection of acoustic emission sources, including: (1) computing, for each of the acoustic emission sources, a set of 3D positions of a source-location of the acoustic emission source, utilizing the seismic arrival time values from the acoustic emission source detected along the acoustic sensing cable, (2) identifying an orientation of a fracture plane utilizing the sets of 3D positions, where the identifying utilizes a best fit algorithm, and (3) reducing, utilizing the fracture plane, a portion of the sets of 3D positions to one or two spatially determined positions.
B. A computer program product having a series of operating instructions stored on a non-transitory computer-readable medium that directs a data processing apparatus when executed thereby to perform operations, including: (1) computing at least one set of 3D positions of source-locations from detected acoustic emission sources, utilizing a transmission time value from the acoustic emission source to an acoustic sensing cable, (2) identifying an orientation of a fracture plane utilizing the sets of 3D positions, wherein the identifying utilizes a best fit algorithm, and (3) reducing, utilizing the fracture plane, a portion of the sets of 3D positions to a solution set of one or two spatially located source-locations.
C. A system to determine fracture geometry parameters of a subsurface fracture in a first borehole, including: (1) an acoustic sensing cable, located in a second borehole, and operable, as part of an acoustic sensing system, to detect and acquire source-locations for one or more microseismic events within a region proximal to the acoustic sensing cable, and transmit the source-locations, and (2) a hydraulic fracturing processor, operable to receive the source-locations, operable to compute a set of 3D positions for each of the source-locations, operable to determine a fracture plane intersecting a first subset of the sets of 3D positions, and operable to reduce, utilizing the fracture plane, each of the sets of 3D positions, in the first subset, to a solution set of one or two source-locations.

Each of aspects A, B, and C can have one or more of the following additional elements in combination: Element 1: wherein the acoustic sensing cable is located in a horizontal portion of the first borehole. Element 2: wherein the acoustic emission source is a microseismic emission initiated by hydraulic fracturing of a subsurface fracture. Element 3: wherein the arrival time values are one or more of a measured compressional wave (P-wave) arrival times and a measured shear wave (S-wave) arrival times, where the P-wave and the S-waves are at least one of a direct wave, a reflected wave, and a refracted wave emitted by the microseismic emission source. Element 4: wherein the fracture plane approximately aligns with a lateral direction of the subsurface fracture. Element 5: wherein the hydraulic fracturing is initiated in said first borehole. Element 6: wherein the hydraulic fracturing is performed in a proximate second borehole. Element 7: wherein the number of the fracture planes can be one or more. Element 8: wherein the collection of acoustic emission sources is divided into sub-collections, where each sub-collection is associated to one of the fracture planes. Element 9: wherein a subset of the collection of acoustic emission sources is utilized for the identifying said orientation, where the subset is determined by the acoustic emission sources sharing a common attribute. Element 10: wherein the common attribute is a computed seismic attribute and is one or more of origin time, magnitude, P-wave to S-wave ratio, and moment tensor solution. Element 11: wherein the identifying the orientation utilizes a linear regression algorithm. Element 12: wherein the identifying the orientation utilizes a grid search algorithm, utilizing a targeted catch percentage parameter and a targeted V-shape artifact parameter. Element 13: wherein the linear regression algorithm or the grid search algorithm utilizes at least one a-priori parameter, including, regional stress orientation and dominant fracture orientation from a previous hydraulic fracturing. Element 14: further including, calculating a fracture geometry parameter utilizing the reduced sets of 3D positions. Element 15: wherein the fracture geometry parameter includes at least one of fracture azimuth, fracture half-length, fracture height, and fracture width. Element 16: further including, calculating a fracture geometry parameter utilizing the solution set. Element 17: wherein the identifying an orientation of a fracture parameter utilizes at least one of a grid search algorithm and a linear regression algorithm, and utilizes zero or more a-prior parameters. Element 18: wherein the first borehole and the second borehole are the same borehole. Element 19: wherein the hydraulic fracturing processor is operable to compute one or more fracture geometry parameters of the subsurface fracture, utilizing the solution set. Element 20: wherein the fracture geometry parameters comprise at least one of a length, a width, and a height of the subsurface fracture. Element 21: wherein more than one subsurface fracture is located in the first borehole, and the hydraulic fracturing processor is operable to compute fracture geometry parameters for at least one of the subsurface fractures. Element 22: wherein the acoustic sensing cable is a single fiber optic distributed acoustic sensing (DAS) cable. Element 23: wherein the acoustic sensing cable comprises fiber Bragg grating reflectors. Element 24: wherein the acoustic sensing cable is connected to a coherent Rayleigh interrogator. Element 25: wherein the acoustic sensing cable is treated to enhance acoustic sensitivity. Element 26: wherein the acoustic sensing cable is comprised of discrete acoustic sensors operable to capture measurements of acoustic emission, and operable to transmit the measurements. Element 27: further including, a fluid controller operable to cause microseismic events in the subsurface fracture utilizing, in the first borehole, an injection fluid pressure change and an injection fluid volume change.

What is claimed is:

1. A method to utilize an acoustic sensing cable, inserted in a first borehole, to spatially locate, in a three dimensional (3D) space, positions of a collection of acoustic emission sources, comprising:
   computing, for each said acoustic emission source, a set of 3D positions of a source-location of said acoustic emission source, utilizing the seismic arrival time values from said acoustic emission source detected along said acoustic sensing cable;
   identifying an orientation of a fracture plane utilizing said sets of 3D positions, where said identifying utilizes a best fit algorithm; and
   reducing, utilizing said fracture plane, a portion of said sets of 3D positions to one or two spatially determined positions, wherein said reducing determines a direction of said one or two spatially determined positions using an intersection with a locus ring, and said fracture plane and said one or two spatially determined positions are utilized by a well system controller to adjust a fluid treatment plan for said source-location.

2. The method as recited in claim 1, wherein said acoustic sensing cable is located in a horizontal portion of said first borehole.

3. The method as recited in claim 1, wherein said acoustic emission source is a microseismic emission initiated by hydraulic fracturing of a subsurface fracture.

4. The method as recited in claim 3, wherein said arrival time values are one or more of a measured compressional wave (P-wave) arrival times and a measured shear wave (S-wave) arrival times, where said P-wave and said S-waves are at least one of a direct wave, a reflected wave, and a refracted wave emitted by said microseismic emission source.

5. The method as recited in claim 3, wherein said fracture plane approximately aligns with a lateral direction of said subsurface fracture.

6. The method as recited in claim 3, wherein said hydraulic fracturing is initiated in said first borehole.

7. The method as recited in claim 3, wherein said hydraulic fracturing is performed in a proximate second borehole.

8. The method as recited in claim 1, wherein the number of said fracture planes can be one or more.

9. The method as recited in claim 8, wherein said collection of acoustic emission sources is divided into sub-collections, where each sub-collection is associated to one of said fracture planes.

10. The method as recited in claim 1, wherein a subset of said collection of acoustic emission sources is utilized for said identifying said orientation, where said subset is determined by said acoustic emission sources sharing a common attribute.

11. The method as recited in claim 10, wherein said common attribute is a computed seismic attribute and is one or more of origin time, magnitude, P-wave to S-wave ratio, and moment tensor solution.

12. The method as recited in claim 1, wherein said identifying said orientation utilizes a linear regression algorithm.

13. The method as recited in claim 12, wherein said identifying said orientation utilizes a grid search algorithm, utilizing a targeted catch percentage parameter and a targeted V-shape artifact parameter, and wherein said linear regression algorithm or said grid search algorithm utilizes at least one a-priori parameter, including, regional stress orientation and dominant fracture orientation from a previous hydraulic fracturing.

14. The method as recited in claim 1, further comprising:
   calculating a fracture geometry parameter utilizing said reduced sets of 3D positions, wherein said fracture geometry parameter includes at least one of fracture azimuth, fracture half-length, fracture height, and fracture width.

15. A computer program product having a series of operating instructions stored on a non-transitory computer-readable medium that directs a data processing apparatus when executed thereby to perform operations, having operations comprising:
   computing at least one set of three dimensional (3D) positions of source-locations from detected acoustic emission sources, utilizing a transmission time value from said acoustic emission source to an acoustic sensing cable;
   identifying an orientation of a fracture plane utilizing said sets of 3D positions, wherein said identifying utilizes a best fit algorithm; and
   reducing, utilizing said fracture plane, a portion of said sets of 3D positions to a solution set of one or two spatially located source-locations, wherein said reducing determines a direction of said one or two spatially determined positions using an intersection with a locus ring, and said fracture plane and said one or two spatially determined positions are utilized by a well system controller to adjust a fluid treatment plan for said source-location.

16. The computer program product as recited in claim 15, further comprising:
calculating a fracture geometry parameter utilizing said solution set.

17. The computer program product as recited in claim 15, wherein said identifying an orientation of a fracture parameter utilizes at least one of a grid search algorithm and a linear regression algorithm, and utilizes zero or more a-prior parameters.

18. A system to determine fracture geometry parameters of a subsurface fracture in a first borehole, comprising:
an acoustic sensing cable, located in a second borehole, and operable, as part of an acoustic sensing system, to detect and acquire source-locations for one or more microseismic events within a region proximal to said acoustic sensing cable, and transmit said source-locations; and
a hydraulic fracturing processor, operable to receive said source-locations, operable to compute a set of three dimensional (3D) positions for each of said source-locations, operable to determine a fracture plane intersecting a first subset of said sets of 3D positions, and operable to reduce, utilizing said fracture plane, each of said sets of 3D positions, in said first subset, to a solution set of one or two source-locations, wherein said reduce includes determining a direction of said one or two source-locations using an intersection with a locus ring, and said fracture plane and said one or two source-locations are utilized by a well system controller to adjust a fluid treatment plan for said source-locations.

19. The system as recited in claim 18, wherein said first borehole and said second borehole are the same borehole.

20. The system as recited in claim 18, wherein said hydraulic fracturing processor is operable to compute one or more fracture geometry parameters of said subsurface fracture, utilizing said solution set, wherein said fracture geometry parameters comprise at least one of a length, a width, and a height of said subsurface fracture.

21. The system as recited in claim 20, wherein more than one subsurface fracture is located in said first borehole, and said hydraulic fracturing processor is operable to compute fracture geometry parameters for at least one of said subsurface fractures.

22. The system as recited in claim 18, wherein said acoustic sensing cable is selected from the group consisting of:
a single fiber optic distributed acoustic sensing (DAS) cable,
an acoustic sensing cable comprising fiber Bragg grating reflectors,
an acoustic sensing cable connected to a coherent Rayleigh interrogator,
a DAS cable treated to enhance acoustic sensitivity, and
an acoustic sensing cable comprised of discrete acoustic sensors operable to capture measurements of acoustic emission, and operable to transmit said measurements.

23. The system as recited in claim 18, further comprising:
a fluid controller operable to cause microseismic events in said subsurface fracture utilizing, in said first borehole, an injection fluid pressure change and an injection fluid volume change.

* * * * *